(12) United States Patent
Haramboure et al.

(10) Patent No.: US 9,500,762 B2
(45) Date of Patent: Nov. 22, 2016

(54) BOREHOLE RESISTIVITY IMAGER USING DISCRETE ENERGY PULSING

(75) Inventors: Carlos Haramboure, Houston, TX (US); Macmillan Wisler, Kingwo0d, TX (US)

(73) Assignee: Precision Energy Services, Inc., Houston, TX (US)

( * ) Notice: Subject to any disclaimer, the term of this patent is extended or adjusted under 35 U.S.C. 154(b) by 1283 days.

(21) Appl. No.: 13/236,153

(22) Filed: Sep. 19, 2011

(65) Prior Publication Data

US 2013/0069656 A1    Mar. 21, 2013

(51) Int. Cl.
G01V 3/00  (2006.01)
G01V 3/24  (2006.01)

(52) U.S. Cl.
CPC ........................................ G01V 3/24 (2013.01)

(58) Field of Classification Search
CPC .......... G01N 33/2823; G01R 31/2644; G01R 33/4831; G01V 1/28; G01V 2210/6224
USPC .................... 324/323, 346–358, 360–375
See application file for complete search history.

(56) References Cited

U.S. PATENT DOCUMENTS

| | | | |
|---|---|---|---|
| 4,536,713 A | | 8/1985 | Davis et al. |
| 4,625,173 A | | 11/1986 | Wisler et al. |
| 4,731,744 A | * | 3/1988 | Harrell et al. ................. 356/617 |
| 5,043,668 A | * | 8/1991 | Vail, III ........................ 324/368 |
| 5,144,245 A | | 9/1992 | Wisler |
| 5,230,386 A | | 7/1993 | Wu et al. |
| 5,235,285 A | | 8/1993 | Clark et al. |
| 5,530,358 A | | 6/1996 | Wisler et al. |
| 5,574,374 A | | 11/1996 | Thompson et al. |
| RE35,386 E | | 12/1996 | Wu et al. |
| 5,581,024 A | | 12/1996 | Meyer, Jr. et al. |
| 5,682,099 A | | 10/1997 | Thompson et al. |
| 5,811,972 A | | 9/1998 | Thompson et al. |
| 5,812,068 A | | 9/1998 | Wisler et al. |
| 5,892,361 A | | 4/1999 | Meyer, Jr. et al. |

(Continued)

FOREIGN PATENT DOCUMENTS

WO    2010060040 A1    5/2010
WO    2011014270        2/2011

OTHER PUBLICATIONS

First Office Action in counterpart Canadian Appl. 2,788,228, dated May 14, 2014.

(Continued)

*Primary Examiner* — Vincent Q Nguyen
*Assistant Examiner* — Trung Nguyen
(74) *Attorney, Agent, or Firm* — Blank Rome LLP

(57) ABSTRACT

A resistivity imager uses discrete energy pulsing to determine resistivity of a borehole. The imager has pulse generation circuitry that generates discrete energy pulses. An electrode array exposed to the borehole emits or discharges the discrete energy pulses into the formation. The variations of the formation subject the electrode to impedance levels in response to the discrete energy pulses, and measurement circuitry measures the discharge of the pulsed energy subjected to the impedances. From the measurements, control circuitry determines resistivity parameters of the formation around the borehole. These resistivity parameters can be stored in memory downhole or can be telemetered to the surface. When analyzed, the resistivity measurements can produce an image of the borehole's features, indicate borehole structures, direct geosteering of drilling, or the like.

33 Claims, 12 Drawing Sheets

(56) References Cited

U.S. PATENT DOCUMENTS

| | | | |
|---|---|---|---|
| 6,060,884 | A | 5/2000 | Meyer, Jr. et al. |
| 6,081,116 | A | 6/2000 | Wu et al. |
| 6,173,793 | B1 | 1/2001 | Thompson et al. |
| 6,179,066 | B1 | 1/2001 | Nasr et al. |
| 6,230,822 | B1 * | 5/2001 | Sullivan et al. ............... 175/40 |
| 6,272,434 | B1 | 8/2001 | Wisler et al. |
| 6,288,548 | B1 | 9/2001 | Thompson et al. |
| 6,348,796 | B2 | 2/2002 | Evans et al. |
| 6,459,262 | B1 | 10/2002 | Wisler et al. |
| 6,600,321 | B2 | 7/2003 | Evans |
| 6,703,833 | B2 | 3/2004 | Wisler et al. |
| 6,703,837 | B1 | 3/2004 | Wisler et al. |
| 6,788,066 | B2 | 9/2004 | Wisler et al. |
| 7,242,194 | B2 | 7/2007 | Hayman et al. |
| 7,250,768 | B2 | 7/2007 | Ritter et al. |
| 7,397,250 | B2 | 7/2008 | Bespalov et al. |
| 7,576,543 | B2 | 8/2009 | Ritter et al. |
| 7,755,973 | B2 | 7/2010 | Tello |
| 8,036,830 | B2 | 10/2011 | Feng |
| 2001/0011590 | A1 * | 8/2001 | Thomas et al. ............... 166/248 |
| 2008/0224707 | A1 | 9/2008 | Wisler et al. |
| 2009/0289808 | A1 * | 11/2009 | Prammer ................... 340/853.7 |
| 2009/0295392 | A1 | 12/2009 | Feng |
| 2010/0018304 | A1 | 1/2010 | McGregor |
| 2010/0019771 | A1 | 1/2010 | Gold et al. |
| 2010/0052690 | A1 | 3/2010 | Gold et al. |
| 2011/0084699 | A1 | 4/2011 | Wisler et al. |
| 2011/0241690 | A1 * | 10/2011 | Hayman ...................... 324/355 |

OTHER PUBLICATIONS

WorldOil.com—Online Magazine Article: Features—Mar. 2008, obtained from http://www.worldoil.com/magazine/MAGAZINE_DETAIL.asp?ART_ID=3469&MONTH_YEAR=Mar-2008, generated on Jun. 18, 2008.

"LWE/MWD Resistivity Tool Parameters," Complied by John Zhou, Resistivity SIG, Apr. 21, 2009, 18 pages.

"Resistivity While Drilling—Images from the String," Oilfield Review, Spring 1996, 16 pages.

Gillespie, A. B. "Electronics and Waves Series: Signal, Noise, and Resolution in Nuclear Counter Amplifiers," (1954), pp. 14-18, 59-69, 129-133.

"Star Trak 4¾" Tool Design," Answers While Drilling, COpyright Baker Hughes Inc. 2009 Slide 6/28, 1 page.

"Star Trak LWD Imaging System: Enhance production with hihg-definition LWD electrical imaging," Baker Hughes, obtained from www.bakerhughes.com, (c) 2010 Baker Hughes Incorporated, Product overview 30205, 1 page.

Caen Nuclear Physics "WP2081 Digital Pulse Processing in Nuclear Physics: Preliminary," by Carlo Tintori, www.caen.it, undated, 21 pages.

"Electromagnetic Wave Resistivity MWD Tool," by Paul F. Rodney, et al., SPE Drilling Engineering vol. 1, No. 5, Oct. 1986, pp. 337-346, Copyright 1986, Society of Petroleum Engineers.

* cited by examiner

BOREHOLE RESISTIVITY IMAGER USING DISCRETE ENERGY PULSING

BACKGROUND

Measurements of electrical properties of an earth formation penetrated by a borehole have been used for decades in hydrocarbon exploration and production operations. The resistivity of hydrocarbon is greater than saline water. Therefore, a measure of formation resistivity can be used to delineate hydrocarbon-bearing formations from saline water-bearing formations.

Electrical borehole measurements are also used to determine a wide range of geophysical parameters of interest, including the location of bed boundaries, the dip of formations intersecting by the borehole, and anisotropy of material intersected by the borehole. Electrical measurements can also be used to "steer" the drilling of the borehole.

Borehole instruments or "tools" used to obtain electrical measurements typically have one or more antennas or transmitting coils and have one or more receivers or groups of electrodes. The one or more antennas are energized by an alternating electrical current, and resulting EM energy interacts with the surrounding formation and borehole environs by propagation or by induction of currents within the borehole environs. In turn, the one or more receivers on the tool respond to this EM energy or current. In general, a single coil or antenna can serve as both a transmitter and a receiver on the tool. Other types of tools used to evaluate electrical properties of the formations contain an array of electrodes that inject currents into the formation and read voltages and/or currents.

The electrical measurements may be telemetered to the surface of the earth via a conveyance, such as wireline or drill string equipped with a borehole telemetry system. Alternately, the electrical measurements can be stored within the borehole tool for subsequent retrieval at the surface. Based on the measurements, various parameters of interest, such as those listed above, can be determined using calculations and formulation well known in the art.

One borehole tool used to obtain electrical measurements is a resistivity imager, which can be conveyed downhole on a drill string or a wireline. When disposed in a borehole, the imager can image a borehole's resistivity (conductivity) and characterize faults, fractures, folds, unconformities, reefs, salt domes, sedimentary bodies, dip direction, beds, and the like.

When used in a borehole having conductive mud (i.e., water-based mud (WBM)), the resistivity imager can use a measuring electrode that emits or discharges current to a return electrode through the formation. When the current and voltage drop between the electrodes is measured, calculations based on Ohm's Law can determine the resistivity of the formation adjacent the measuring electrode. The imager's resolution is inversely proportional to the size of measuring electrode used. Accordingly, a larger measuring electrode produces a lower resolution and vice versa.

A resistivity imager used in non-conductive mud (i.e., oil-based mud (OBM)) typically has four-terminals and includes an injection electrode, a return electrode, and at least two sensor electrodes. The injection and return electrodes are used for injecting current into a formation, while the measuring electrodes measure a potential gradient between the injection and return electrodes. In these imagers, the image resolution is inversely proportional to the space between the measuring electrodes, and the measured signal strength is proportional to the distance between the measuring electrodes. Accordingly, a large distance between the measuring electrodes produces a lower resolution and vice versa.

Existing resistivity imagers use a sinusoidal signal to image the borehole, and conventional electronics produce this sinusoidal signal continuously during operation. As a result, existing imagers can use a considerable amount of energy to image the borehole, and power supplies downhole can be limited.

Nevertheless, the continuous sinusoidal signal allows the imager to use standard correlation techniques to improve the signal-to-noise ratio of the resulting resistivity measurements. As is known, a standard correlation filter takes running averages of successive waveforms and correlates these at different points in the signal. This essentially reduces any noise present in the signal to improve the signal-to-noise ratio of the measurements for better analysis. Understandably, averaging for the correlation process requires time to obtain successive waveforms. In a downhole MWD/LWD environment, the rotation of the imager about the borehole when obtaining measurements can limit how much improvement in the signal-to-noise ratio can be achieved. In this situation, time becomes space, and the azimuthal resolution of the measurements becomes degraded when too much time is needed to obtain successive waveforms for correlation and noise reduction.

The subject matter of the present disclosure is directed to overcoming, or at least reducing the effects of, one or more of the problems set forth above.

SUMMARY

A borehole resistivity sensor (often referred to as an "imager") disposes on a downhole body in the borehole of the formation. This downhole body can be part of a wireline tool conveyed in the borehole, or it can be a Measurement-While-Drilling (MWD) or Logging-While-Drilling (LWD) tool used on a drill collar or other component during the drilling of the borehole. When deployed, the imager injects discrete energy pulses into a surrounding formation of a borehole. After measuring a survey current and voltage at the imager's electrodes at particular orientations in the borehole, the imager processes the resulting measurements using nuclear pulse processing techniques and determines the resistivity (conductivity) of the formation around the borehole.

The imager has pulse generation circuitry that generates the discrete energy pulses, and an array of electrodes exposed to the formation and the mud in the borehole emits or discharges these discrete energy pulses into the formation. Because the formation around the borehole has different structures, compositions, fluids, etc., the electrodes are subjected to differing impedances as the discrete energy pulses discharge relative to the characteristics of the formation encountered.

The imager's components producing the energy pulse form a resonant circuit with the formation and mud in the borehole. Therefore, characteristics of the pulse's discharge (such as the discharge's resonant frequency, decay, and peak amplitude) depend largely on the characteristics of the formation and mud encountered in the borehole. Since the discharge's frequency depends on the formation and mud characteristics, the operating frequency of the imager can self-adjust to an optimum value needed to inject the energy pulse, which can conserve power consumption. The resonant circuit formed between the imager and the formation and mud also enables the imager to measure in both conductive and non-conductive mud. In this way, the imager can obtain a measurement in both Oil-Based Mud (OBM) and Water-Based Mud (WBM) without needing to change the electrical or physical configuration of the imager.

In addition to the pulse generation circuitry, the imager has measurement circuitry operatively coupled to the array of electrodes. The measurement circuitry measures voltage and current responses as the discrete energy pulses discharge subjected to the impedances. The terms "discharge," "pulse discharge," "discharged pulse," and the like refer to the discharge of discrete energy that pulses at the array after a reactive component releases its stored energy. Finally, control circuitry controls the timing of the pulses, adjusts the energy level, and performs other functions noted herein.

In particular, the control circuitry responds to the discharge by measuring the voltage and survey current responses obtained with the measurement circuitry. The control circuitry then processes these measurements to determine resistivity (conductivity) parameters of the formation around the borehole. These resistivity (conductivity) parameters can be stored in memory downhole or can be telemetered to the surface. When analyzed and combined with the output of a toolface or angle-indicating device and with an indication of the tool's axial movement in the borehole, the variations in resistivity (conductivity) in the borehole can produce an image of the borehole's features, indicate borehole structures, direct geosteering of drilling, or be used for other purposes consistent with borehole resistivity measurements.

To generate the discrete energy pulses, the pulse generation circuitry has a reactive component that can be selectively coupled to a power source, such as a downhole battery. Various types of reactive components can be used, including an inductor, a transformer, and a capacitor. For its part, the electrode array can have a measuring electrode, a guard electrode surrounding the measuring electrode, and a return electrode. In a preferred implementation, the return electrode is part the body of the downhole tool, such as part of a drill collar. Insulators separate the electrodes from one another, and the guard electrode preferably has a greater surface area than the measuring electrode.

When subjected to the discrete energy pulse, the measuring electrode emits current into the formation, while the guard electrode under a voltage helps direct the current in a straighter path into the formation. The return electrode receives the current returning from its path into and through the formation. The measurement circuitry then measures the survey current and the voltage as discussed below in response to the discharged pulse.

In particular, the measurement circuitry has a voltage measuring circuit that measures the voltage differential between the array's return electrode and the guard electrode during the discharge of the pulse. The measurement circuitry also has a current measuring circuit that measures a survey current at the measuring electrode during the discharge. Looking at the ratio of voltage to current can then give an indication of the resistivity (conductivity) of the formation encountered by the array during the emitted pulse.

Because pulses of discrete energy are used, the imager's control circuitry uses a pulse processing chain to process the measured pulse responses of voltage and current. A number of pulse processing chains can be used. For example, an analog pulse processing chain can have a shaping network that determines the peak amplitude of the measured response, which is then used in the resistivity analysis. Other pulse processing techniques can use digital signal processing to determine amplitude levels and other features of the measured response.

Time constants used for the pulse processing can be selected to improve the signal-to-noise ratio. For example, the time constants can include a differentiation time constant and an integration time constant that are the same. Moreover, the time constants can be selected to give an improved signal-to-noise ratio even under the worst of measurement conditions. In the end, the imager can evaluate the signal-to-noise ratio from previous measurements and can establish the proper energy level to deliver in the next measuring sequence. This reduces the imager's power consumption so the imager uses only the minimum amount of power needed to have a good measurement.

The foregoing summary is not intended to summarize each potential embodiment or every aspect of the present disclosure.

DETAILED DESCRIPTION

A. Resistivity Measurement System

Figure 1:
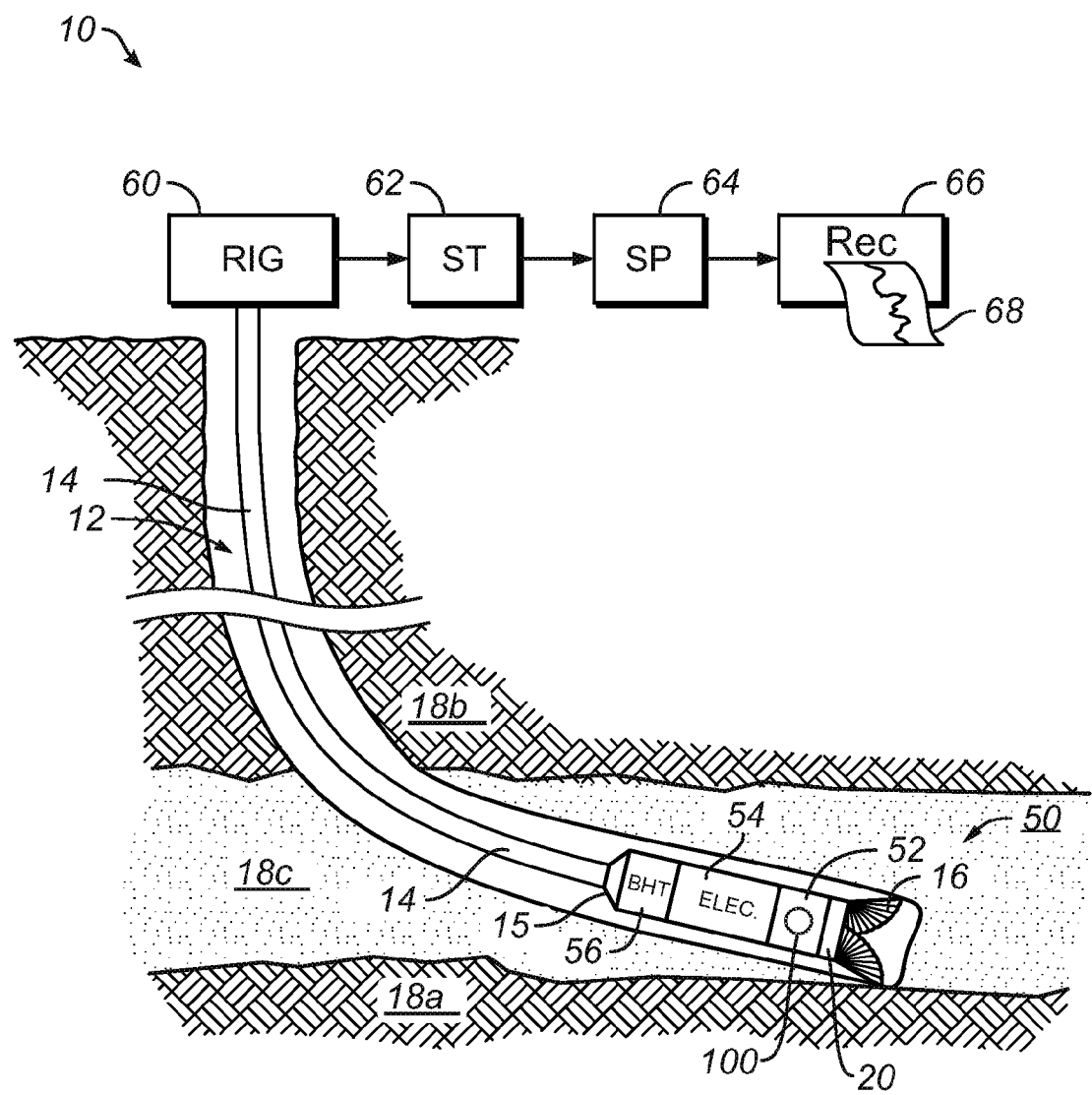
FIG. 1 illustrates a downhole assembly having a borehole resistivity imager according to the present disclosure.

A resistivity measurement system 10 for a Measurement-While-Drilling (MWD) and Logging-While-Drilling (LWD) environment illustrated in FIG. 1 includes a downhole tool 50, which disposes in a borehole 12 and is operatively connected to a drill string 14 by a suitable connector 15. At its lower end, the system 10 has a drill bit 16. Uphole, a rotary drilling rig 60 rotates the drill string 14, the downhole tool 50, and the drill bit 16 to drill the borehole 12. Although not shown, components from other forms of drilling can also be used, including a downhole drilling motor, coiled tubing, and the like.

The downhole tool 50 has a sensor subsection 52, an electronics subsection 54, and a telemetry subsection 56. The sensor subsection 52 has a resistivity sensor (often referred to as a "borehole resistivity imager") 100, which is used to determine the formation's resistivity (conductivity) at various locations. (As will be appreciated, resistivity and conductivity are reciprocals of one another so they may be used interchangeably herein.) The variation in the resistivity (conductivity) can then be used to produce an image of the periphery of the borehole 12.

Each of these tool's subsections 52-56 and components of the imager 100 are preferably disposed on or within the wall of a drill collar 20, which can serve as a pressure housing for the downhole tool 50. As such, the present arrangement depicts the disclosed tool 50 on a bottom hole assembly (BHA) conveyed on the drill collar 20. One or more stabilizers (not shown) can be used on the drill collar 20 and can stabilize drilling and maintain a consistent standoff for the imager 100 from the borehole wall.

As will be appreciated, however, concepts of the system 10 are applicable to other types of borehole conveyance. For example, the disclosed tool 50 could also be implemented on a wireline conveyed logging string. Thus, the disclosed imager 100 can be used on a wireline tool even though the present disclosure describes it used in the context of MWD/LWD. The body of such a wireline tool would generally not rotate, but would have similar components to those disclosed herein. Moreover, the imager 100 can be disposed on a non-rotating sleeve as the downhole component 20 in a drilling application.

The sensor subsection 52 contains components of the resistivity imager 100, which measures and processes data indicative of the resistivity of the formation being drilled. The electronic subsection 54 contains components of the resistivity imager 100 for storing and communicating the data, and the telemetry subsection 56 telemeters data to the surface and can receive data from the surface. As always, the various electronic components of the imager 100 and downhole tool 50 can be configured to better use available power and to reduce the physical size of the electronic packaging for use in the downhole environment.

At the surface, a surface telemetry unit 62 receives data when telemetered from the telemetry subsection 56. A surface processor 64 cooperating with the surface telemetry unit 62 handles the data. In addition, the surface processor 64 can obtain data uploaded from the downhole tool's memory when brought to the surface. Either way, the surface processor 64 can perform additional mathematical operations associated with standard geological applications. Processed data can then be output to a recorder 66 for storage and optionally for output as a function of measured depth to form an "image" or "log" 68 of one or more parameters of interest, such as the borehole's resistivity or conductivity. All throughout operations, signals can also be sent downhole to vary the direction of drilling or to vary the operation of the downhole tool 50.

The borehole 12 in FIG. 1 is deviated and penetrates an upper formation 18b, which is bounded at the bottom by an intermediate formation 18c. Using hydrocarbon drilling as an example, this intermediate formation 18c may be a hydrocarbon bearing formation, such as oil-saturated sand. The boundary formations 18a and 18b would typically be non-hydrocarbon producing formations, such as shale. Deviated drilling operations attempt to advance the borehole 12 within the producing formation 18c to maximize production. To aid in this objective, the downhole tool 50 can produce resistivity measurements of the borehole 12, which can then be used to geosteer within the producing formation 18c. The resistivity measurements and resulting image could also be used for a number of other purposes known in the art.

Figure 2:
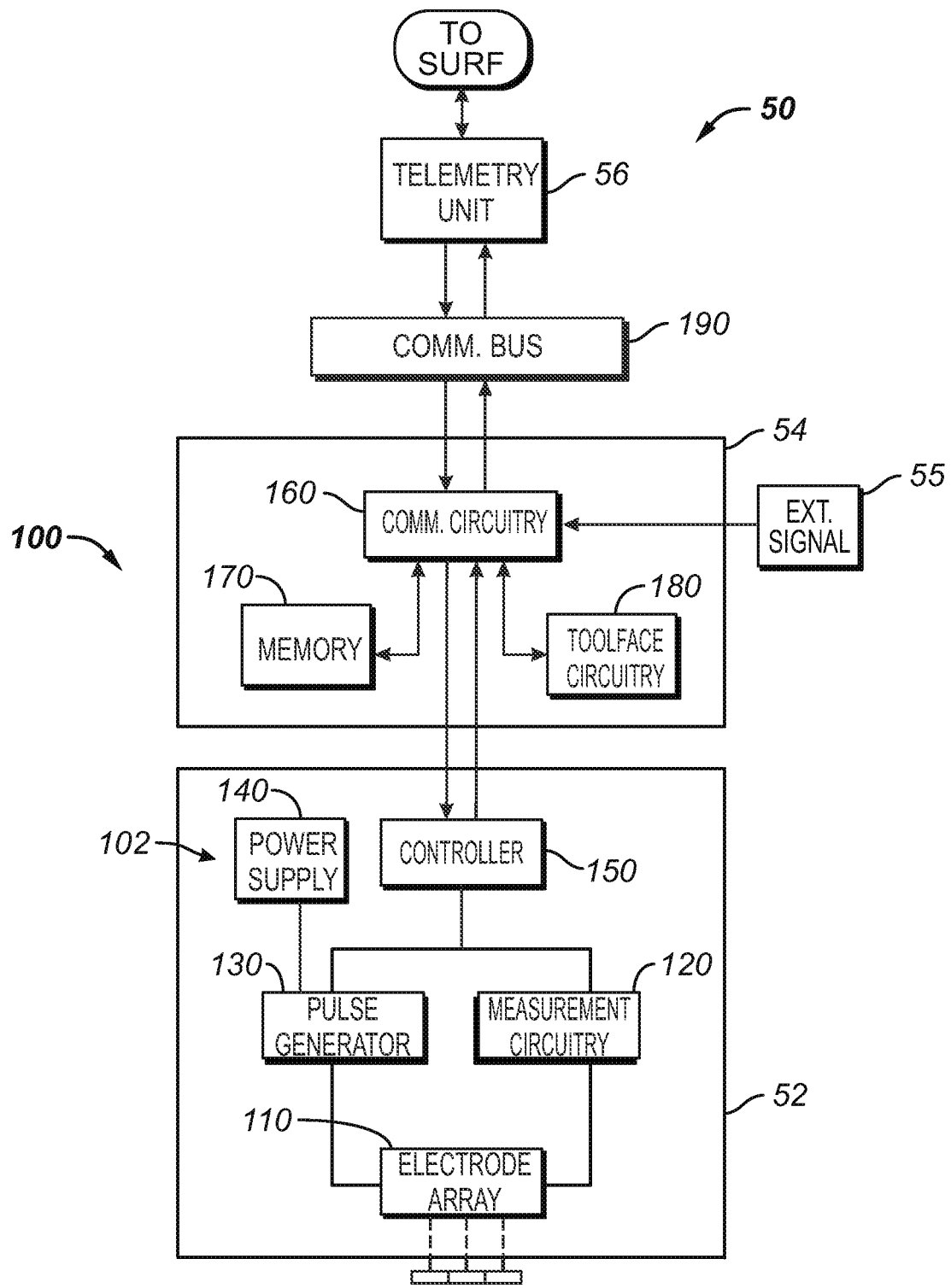
FIG. 2 illustrates components of the borehole resistivity imager and downhole assembly.

With an understanding of the overall resistivity measurement system 10, discussion now turns to FIG. 2, which shows a functional diagram of the downhole tool 50. Here as well as in other Figures, the diagram presented is conceptual in nature for purposes of illustration and is not intended to limit the disclosed tool 50 to specific mechanical configurations or electronic circuit designs.

The tool's sensor subsection 52 has acquisition circuitry 102 of the imager 100, including an electrode array 110, associated measurement circuitry 120, pulse generator 130, power supply 140, and control circuitry or controller 150. More than one array 110 and associated components may be used in a given implementation as detailed later. The power supply 140 can be located here or in any advantageous location on the tool 50, and more than one power supply can be used.

The components in the sensor subsection 52 operatively connect to the electronics subsection 54, which has communication circuitry 160, memory 170, and toolface circuitry 180, among other typical components not necessarily shown. The communication circuitry 160 connects to the controller 150, the memory 170, and the toolface circuitry 180. The memory 170 stores measured data, and toolface circuitry 180 can provide orientation information (e.g., toolface, azimuth, inclination, etc.) of the tool 50 when in the borehole and can have an inclinometer, accelerometers, magnetometers, gyroscope, and the like. Additionally, the communication circuitry 160 can obtain external signals 55 from other sources, which can provide other details during operation.

Output from the communication circuitry 160 proceeds via a communication bus 190 to the telemetry subsection 56, which can use any one of a variety of telemetry units known in the art. In this way, information from the electronics subsection 54 can be telemetered to the surface via the telemetry subsection 56 and/or can be stored in the tool's memory 170 for later retrieval. Conversely, information, such as commands, operating parameters, and the like, can be telemetered from the surface to the telemetry subsection 56 on the downhole tool 50.

In a typical tradeoff in the downhole environment, more or less processing may be performed downhole, uphole, or shared between uphole and downhole processors depending on the available memory 170 in the tool 50, the bandwidth for telemetry, the processing capabilities of the downhole controller 150, and the like. Increasing the downhole memory 170 in the tool 50 or increasing bandwidth using wired pipe or the like can change the circumstances of this tradeoff between the downhole and uphole processing and the amount of data collected. Thus, the downhole tool 50 can be configured accordingly for a particular implementation.

Briefly, during operation of the tool 50, the toolface circuitry 180 provides an orientation (i.e., toolface) reading to the communication circuitry 160, which then signals to the controller 150 to acquire a measurement. The acquisition circuitry 102 of the imager 100 obtains a measurement, as described in more detail below, and the controller 150 process the measurement to determine a parameter indicative of the resistivity (conductivity). The controller 150 returns the measured parameter to the communication circuitry 160, and this measured parameter along with the particular orientation is then stored in memory 170 for later retrieval when the tool 50 is brought to the surface. Intermittently, measured parameters and orientations can be telemetered to the surface using the telemetry subsection 56. Although sparse, this information can then be used by surface operators to monitor operation of the tool 50, determine when a formation boundary has been passed, perform geosteering, etc.

B. Resistivity Imager

Figure 3:
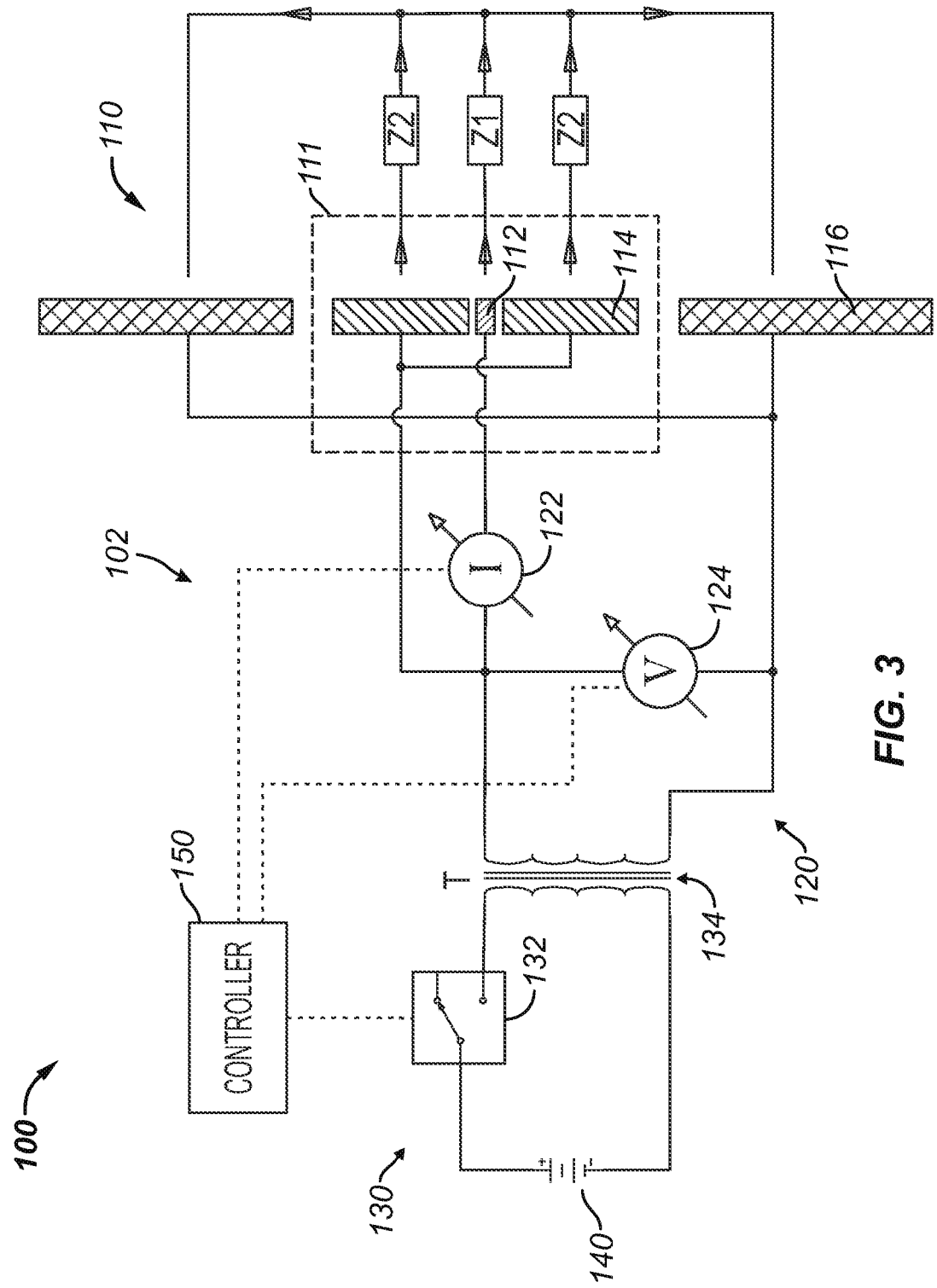
FIG. 3 illustrates a schematic of the borehole resistivity imager, showing an electrode array and associated circuitry.

Having an overall understanding of the resistivity measurement system 10 and the downhole tool 50, discussion now turns to particular details of the borehole resistivity imager 100, its associated circuitry, and its operation. Turning then to FIG. 3, a schematic of the resistivity sensor ("imager") 100 is shown along with some of its associated circuitry. As noted previously, the resistivity imager 100 includes the electrode array 110, measurement circuitry 120, pulse generation circuitry 130, power supply 140, and controller 150.

The electrode array 110 has one or more measuring electrodes 112 and has one or more guard electrodes 114 that surround the measuring electrode(s) 112. Together, the measuring electrode(s) 112 and the guard electrode 114 form a pad 111 that disposes on the face of the drill collar (20; FIG. 1) and faces the borehole wall passing through a formation. Finally, the array 110 is completed by a return electrode 116 disposed further outward from the guard electrode 114 and the current measuring electrode(s) 112. In a preferred implementation, the return electrode 116 is actually part the body of the tool, such as part of the drill collar (20; FIG. 1).

The measurement circuitry 120 and the pulse generation circuitry 130 couple to the electrode array 110. The pulse generation circuitry 130 generates discrete energy pulses for injection into the formation with the array 110, while the measurement circuitry 120 measures responses of the pulse discharges at the array 110 for determining the formation's resistivity for the purposes discussed herein. As shown, the measurement circuitry 120 includes a current measurement circuit 122 and a voltage measurement circuit 124. These circuits 122 and 124 can use any conventional electronic components to perform their measurements in the downhole environment and operating conditions. Accordingly, known components could be used and are not detailed herein.

The pulse generation circuitry 130 includes a switch 132 for selectively connecting the power supply 140 to a reactive component 134. As shown, the reactive component 134 can be a transformer, although other components can be used. For example, the pulse generation circuitry 130 can be configured to use a capacitor as the reactive component 134 to produce the desired energy exchange process from the power source 140 to the formation. To get the benefit of the measurement technique discussed herein, an inductor or transformer may be added to the capacitor configuration to form a resonant circuit with the formation, as discussed much later.

Naturally, the controller 150 has one or more suitable processors (not shown) and associated electronics for operating in a downhole environment. During operation, the controller 150 controls the switch 132 and operates in conjunction with the measurement circuits 122 and 124 to control operation and obtain measurement data. The switch 132 can use any suitable electronics, and the power source 140 is typically a battery power supply maintained in the downhole tool (50; FIG. 1).

Activated by the controller 150, the pulse generation circuitry 130 connects the energy from the power supply 140 to the electrodes 112, 114 during measurement cycles and provides desired current and voltage to drive discharges of pulsed energy into the formation with the array 110. As a result of the pulses, the various electrodes 112 and 114 shown in FIG. 3 are cyclically exposed to impedances $Z_1$ and $Z_2$ from the adjacent formation (not shown) and any intervening mud. In turn, measurements of the voltage and current responses resulting from the discharge of the pulsed energy relative to these impedances $Z_1$ and $Z_2$ provide details indicative of the formation's resistivity.

More particularly, the controller 150 as shown in FIG. 3 starts a first part of a measurement cycle by activating the switch 132 and storing energy in the reactive component (i.e., transformer) 134. When this happens, energy from the power supply 140 stores in the magnetic circuit of the transformer 134. After a period of time and buildup of energy, the controller 150 deactivates the switch 132 to initiate a second part of the measurement cycle. At this point, the energy stored in the magnetic field of the transformer 134 is dissipated in a discharge of the discrete pulse energy into the formation through the array 110.

During this second part of the cycle, the impedances $Z_1$ and $Z_2$ connected to the array 110 influence the discharge, and the controller 150 obtains measurements of the voltage and survey current responses resulting from the discharge as measured by the measurement circuitry 120. In particular, the voltage measurement circuit 124 during the discharge measures the voltage differential between the guard electrode 114 and the return electrode 116. The controller 150 also obtains measurements of the survey current flowing through the measuring electrode 112 using the current measurement circuit 122. (If additional measuring electrodes 112 are used in the pad 111, additional measuring circuits 122 can be coupled to them as well.) The ratio between these voltage and current responses is representative of the encountered impedance $Z_1$ and is indicative of the formation's resistivity (conductivity).

In general, the shape of the discharge in the second part of the cycle is influenced by the characteristics of both impedances $Z_1$ and $Z_2$. As the conductivity of the drilling fluid decreases, for example, the impedances $Z_1$ and $Z_2$ become more capacitive in nature. Thus, the otherwise decaying exponential waveform of the discharge starts to look like a decaying sinusoid. Also noteworthy, the peak amplitude of the pulse discharge becomes higher as the magnitude of both impedances $Z_1$ and $Z_2$ increase. Knowing the influence of the formation on the discharge, pulse processing techniques discussed below determine characteristics (shape, decay, peak amplitude, etc.) of the pulse discharges to determine the voltage and survey current responses of interest.

When characteristics of the discharge are determined, the imager 100 evaluates the ratio between the resulting voltage and survey current and determines parameters indicative of the formation's resistivity (or conductivity). The imager 100 combines the resistivity (conductivity) parameters with the orientations (i.e., toolface) of the downhole tool (50) as noted previously, and an image representing the spatial distribution of resistivities (conductivities) can then be plotted using standard techniques known in the art. The plotted image can then help identify important characteristics of the formation, such as faults, fractures, folds, etc.

The size of the measuring electrode 112 determines the resolution of the imager 100 so different sized measuring electrodes 112 (and more than one electrode 112) may be used depending on the implementation. The separation or standoff between the surface that holds the measuring electrode(s) 112 and the formation also determines the imager's resolution. Therefore, the standoff of the imager's measuring electrode(s) 112 can be configured to obtain different resolutions as desired for a given implementation.

When injecting the discrete energy pulse into the formation, the resistivity imager 100 attempts to produce a current beam having a desired shape into the adjacent formation. Ideally, the current beam does not flow through any intervening mud between the array 110 and the formation, but this is not usually possible in a typical MWD/LWD implementation. To better inject current into the formation, the guard electrode 114 therefore focuses the survey current into the formation in a perpendicular direction. For this reason, the guard electrode 114 is preferably made with a surface area much larger than the current measuring electrode 112 to enhance this focusing. In the end, this focusing can force the current distribution near the measuring electrode(s) 112 to follow a straighter path through the intervening mud and into the formation.

The same configuration of electrodes 112, 114, 116 on the array 110 can be used with both conductive drilling fluids (i.e., WBM) and non-conductive drilling fluids (i.e., OBM). In particular, in non-conducting mud, the imager 100 can operate with a capacitive coupling between the imager electrodes 112, 114, 116 and the formation. In this case, the current is a displacement current instead of an actual flow of charged particles or ions.

Measurements can be further made at the guard electrode 114 to determine the mud's resistivity. For example, rather than using the guard electrode 114 to focus current into the formation, the survey current may be allowed to pass from the measuring electrode 112 and through the mud using the guard electrode 114 for return. The resulting mud resistivity value determined from this can then be used to correct subsequent resistivity measurements of the formation.

C. Arrangements of Electrode Arrays

As discussed previously, the electrode array 110 disposes on a drilling component, which can be a drill collar, non-rotating sleeve, drilling tubular, etc., to face the borehole wall. Looking at the side view of a portion of a drill collar 20 depicted in FIG. 4A, the array 110 has a pad 111 disposed on a raised surface 24 of a stabilizer sleeve 22. The pad 111, as noted previously, has the measuring electrode(s) 112 and the guard electrode 114. For its part, the return electrode (116) can be part of the drill collar 20 or can be a separate electrode (not shown) disposed elsewhere on the collar 20.

In this depiction, the vertical direction indicates an axial direction along the collar 20, and the horizontal direction indicates an azimuthal direction of the collar 20. As the drill collar 20 rotates, the pad 111 follows the collar's rotation and pulses about the inside of the borehole 12 to image the surrounding formation. In this way, the array 110 can image the resistivity of the borehole wall, and the array's azimuthal rotation provides 360-degree coverage as the collar 20 rotates. Stabilizers (not shown) on the sleeve 22 and/or elsewhere on the collar 20 can help center the collar 20 in the borehole 12 during drilling and keep the pad 111 at a standoff from the borehole wall.

During sensing, the measurements of the array 110 are correlated to the orientation of the drill collar 20 in the borehole 12 (and hence map to the borehole's resistivity) using the collar's "toolface" $T_f$. As is known, "toolface" refers to the orientation of a tool (i.e., array 110, drill collar 20, downhole tool 50) relative to a particular reference direction and can generally refer to the sensor face of the tool. The toolface $T_f$ can be obtained in a number of ways and can be derived using readings from sensors (i.e., magnetometer, accelerometer, etc.) and calculations well known in the art. The "toolface" can therefore come from external processing on the tool and can be incorporated into the measurements obtained with the array 110.

Figure 4A:
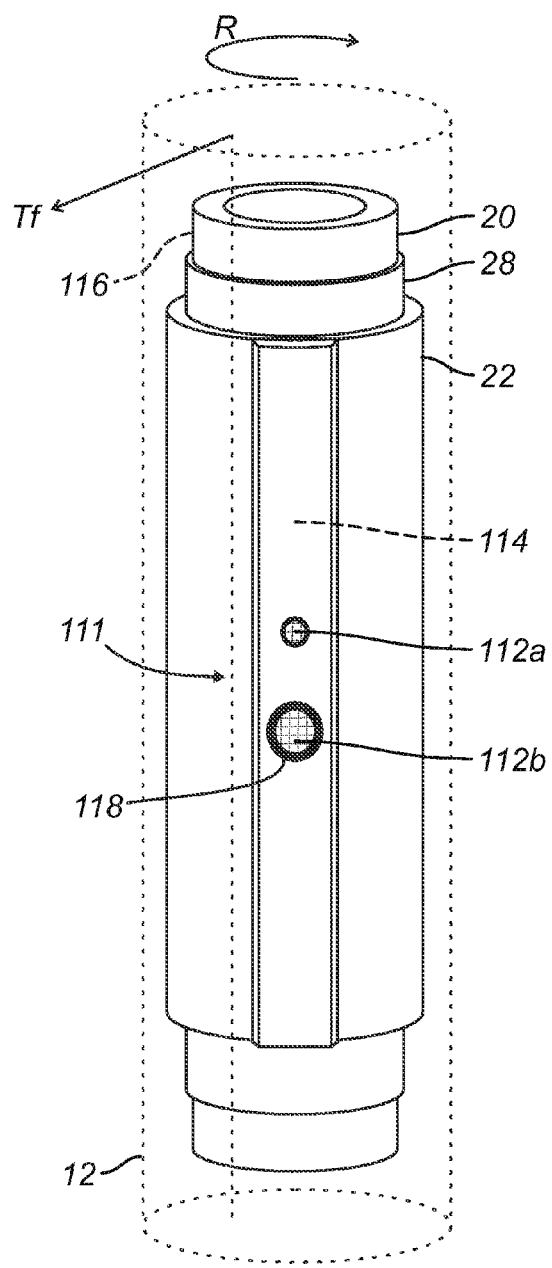
FIG. 4A shows a side view of a downhole component (e.g., a drill collar) having an electrode array according to the present disclosure.
Figure 4B:
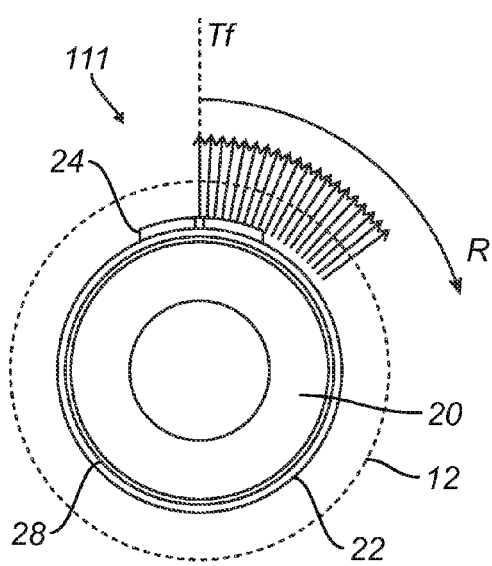
FIG. 4B shows an end view of the downhole component with the electrode array emitting a number of discrete energy pulses during rotation.

As noted above, the resistivity imager 100 uses discrete energy pulses to determine the formation's resistivity rather than using a conventional sine wave signal used in the art. The energy pulses use less power and eliminate the effects of tool rotation. As shown in FIG. 4B, for example, the discrete energy pulses and resulting measurements can preferably be done for a discrete number of particular orientations (toolfaces $T_f$) as the drill collar 20 rotates so that energy is used only when needed. In one implementation, the array's pulses and measurements can be done at 128 discrete points in the drill collar's rotation. In doing this discrete pulsing and measuring, the imager 100 can drive a considerable amount of power into the formation at small time intervals, while using little energy from the tool's power source.

Various arrangements of electrodes 112, 114, 116 for the array 110 can be used on the drill collar 20. In FIG. 4A, for example, the pad 111 has two measuring electrodes 112a-b surrounded by the guard electrode 114 and separated from one another by a longitudinal distance d. As shown, the pad 111 can be disposed on or can be part of the raised surface 24 of the stabilizer sleeve 22 disposed on the drill collar 20. This raised surface 24 can be part of a stabilizer, a separate rib, or other feature. Overall, the entire sleeve 22, just the raised surface 24, or a portion thereof can comprise the guard electrode 114. Insulation 118 separates the measuring electrodes 112a-b from the guard electrode 114, and an insulating sleeve 28 disposed between the stabilizer sleeve 22 and the drill collar 20 can insulate the guard electrode 114 from the drill collar 20, which has the return electrode (116) as noted previously.

Disposed to face the borehole wall, the electrodes 112a-b, 114 can position in closer proximity to the borehole wall. Actual contact between the measuring electrodes 112a-b and the borehole wall may take place, or the electrodes 112a-b may standoff from the borehole wall and may have intervening drilling mud between them and the formation. However, good electrical contact may be all that is necessary for proper measurements to be obtained. In fact, physical contact between the measuring electrodes 112a-b and the formation may not be necessary because the array 110 can operate conductively as noted herein.

Figure 5A:
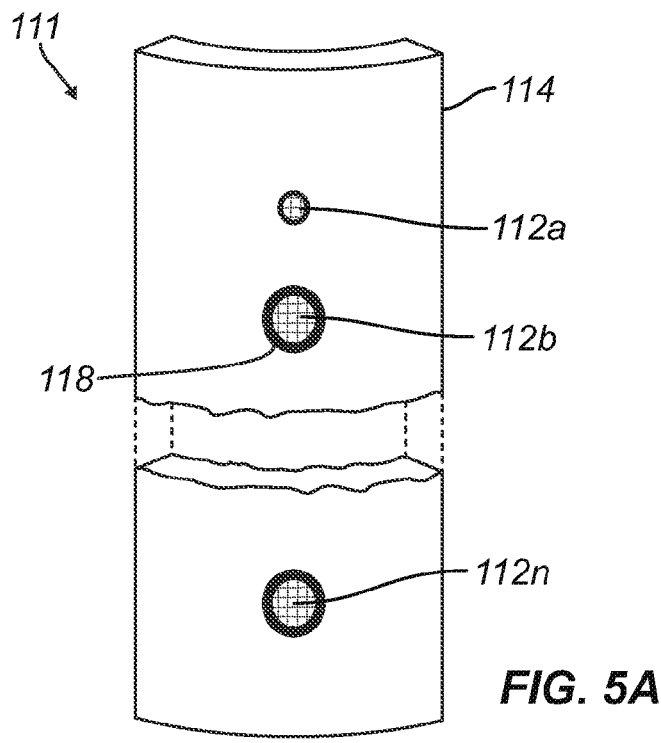
FIG. 5A shows an isolated view of the pad of the electrode array having several measuring electrodes.

In another arrangement of FIG. 5A, a number (n) of measuring electrodes 112a-n are disposed along the guard electrode 114, and the guard electrode 114 can be any suitable length to accommodate the number of measuring electrodes 112a-n. Each of the various electrodes 112a-n can be operated simultaneously or separately during operation depending on the desired implementation. During sensing, the multiple electrodes 112a-n can help compensate for the speed and rotation of the drill collar 20 because redundant measurements from the electrodes 112a-n measuring comparable areas of the borehole wall can be stacked together to improve the results and reduce issues with noise.

The various electrodes 112a-n may have different vertical dimensions (e.g., diameters) to offer desired resolutions. Likewise, one electrode 112a-n may be positioned more radially (azimuthally) outward or inward on the guard electrode 114 than the other electrodes 112a-n, and thus may have a different standoff from the borehole wall. The resulting differences in vertical and azimuthal dimensions of the electrodes 112a-b can give different resolutions, and the imager 100 can exploit these different resolutions in processing the measurements to image the borehole.

It has been found that a smaller button size (e.g., diameter) for the measuring electrodes 112a-n provides better resolution when situated at a closer standoff to the borehole wall. Conversely, a larger button size has been found to provide better resolution at a farther standoff. In general, button sizes for the electrodes 112a-n can range between 0.2 to 0.5-in. and can have a standoff range of about 0.125 to 0.5-in., although these values depend on the resolution of formation features desired in the imaging.

Figure 5B:
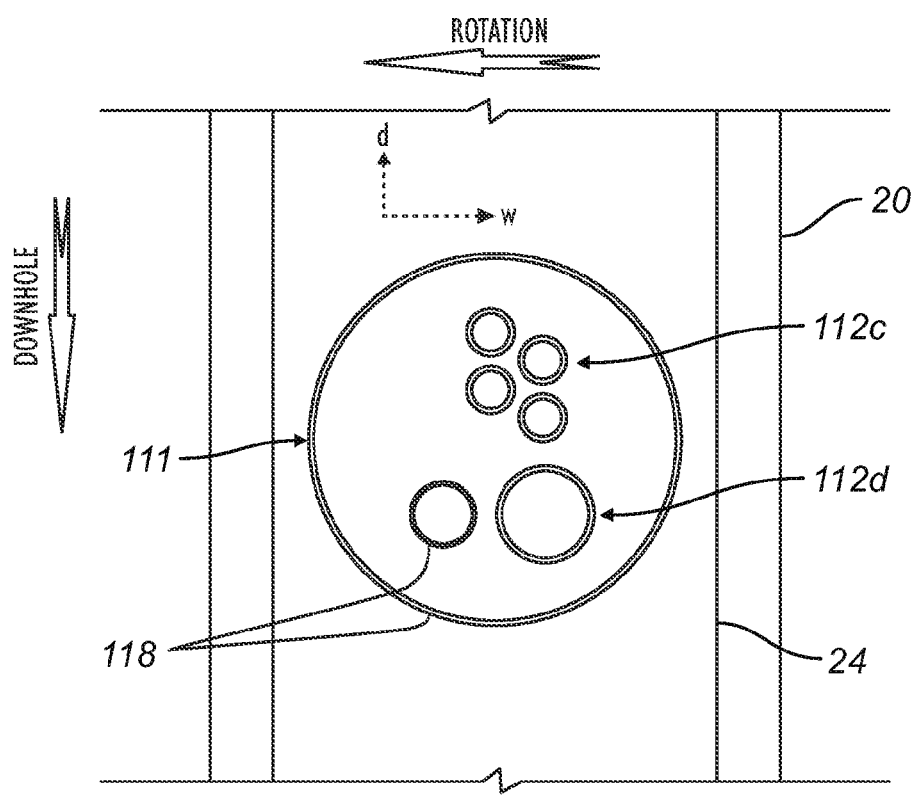
FIG. 5B illustrates another pad for the electrode array on a downhole component of the assembly.

In yet another arrangement of FIG. 5B, a pad 111 has a guard electrode 114 of a different (i.e., circular) shape mounted on the drill collar 20 in a raised portion or stabilizer blade 24. (As noted previously, the return electrode (not shown) can be disposed elsewhere on the drill collar 20 and may be part of the collar 20 itself.) The guard electrode 114 surrounds a number (6) of measuring electrodes 112c-d of various sizes arranged therein, and insulating rings 118 isolate the guard electrode 114 from the drill collar 20 and the measuring electrodes 112c-d.

The measuring electrodes 112c-d on this pad 111 also have a different arrangement than discussed previously. In particular, several smaller measuring electrodes 112c each have the same relative button size, but are arranged together in a cluster at different lateral distances w and longitudinal distances d from one another. In one embodiment, electrodes are arranged as for 112c such that the measurements from the four electrodes 112c have closely adjacent measurements in the axial direction as the tool is rotated. By using this arrangement, full high resolution measurements can be made even though the tool may move axially by more than the resolution of a single button in one revolution of the tool. Separated longitudinally from this cluster of electrodes 112c, two additional electrodes 112d have different button sizes and are arranged at different lateral distances w from one another. Again, each of the various electrodes 112c-d can be operated simultaneously or separately during operation depending on the desired implementation.

As will be evident by the above arrangements, the electrode array 110 can have a number of different arrangements of electrodes 112, 114, and 116. In any of the arrangements, any measuring electrodes 112 that laterally overlap one another can obtain redundant measurements of the same formation area as the drill collar 20 rotates during sensing, and the electrodes 112 can give different resolutions based on the different sizes or the different standoff distances of the electrodes 112. Additionally, as the drill collar 20 rotates and moves longitudinally in the borehole during sensing, any longitudinally separated measuring electrodes 112 in the arrangements can also obtain multiple measurements of the same formation area, which can provide redundant readings, different resolutions, etc.

Although one pad 111 has been shown in the arrangements so far, multiple pads 111 can be installed on the drill collar 20. Each pad 111 may be the same or different from one another depending on the implementation, and the pads 111 can be disposed at different lateral and longitudinal locations on the drill collar 20. As the collar 20 rotates and moves longitudinally in the borehole, the multiple pads 111 can obtain measurements at multiple resolutions and can obtain redundant measurements of one another. In this way, the multiple pads 111 can also help compensate for the speed and rotation of the drill collar 20 during imaging because the redundant measurements can be stacked together to improve the results and reduce issues with noise.

D. Operation and Processing of Resistivity Imager

With an understanding of the imager 100 and the electrode array 110, discussion now turns to more details of the imager's operation, pulsing, and processing. Although some previous details have already been discussed in this regard, the discussion below focuses on additional information.

1. Resonant Circuit

Figure 6:
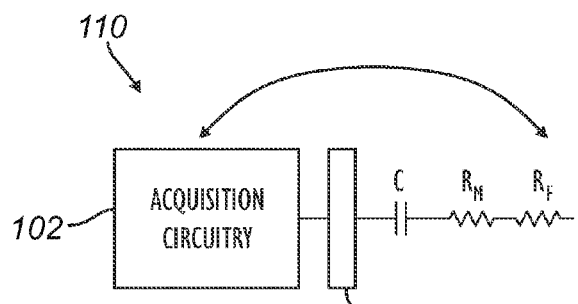
FIG. 6 diagrams how the circuitry of the disclosed imager forms a resonant circuit with the downhole environment, which can help improve power consumption.

As noted previously, the disclosed imager 100 electrically couples with the borehole environment to obtain measurements. FIG. 6 schematically illustrates how the imager's acquisition circuitry 102 and array 110 electrically couple with the borehole environment. As depicted, the borehole environment can be characterized by a resistivity $R_m$ of intervening mud and a resistivity $R_f$ of the formation. A portion of the coupling may also be capacitive C.

In the electric coupling, the acquisition circuitry 102 and array 110 form a resonant circuit with the formation and mud in the borehole, and details of this resonant circuit are advantageous to the operation of the disclosed imager 100. In particular, due to the resonant circuit formed, characteristics of the imager's pulse discharges (such as the resonant frequency, decay, and peak amplitude of the survey current's waveform) largely depend on the characteristics of the formation and mud in the borehole. For example, the frequency of the survey current increases and the electric coupling gradually turns more and more capacitive in nature as the conductivity of the mud/formation combination decreases.

This dependency allows the acquisition circuitry 102 to "tune" its pulsing to the characteristics of the electric coupling, which can improve processing and reduce power consumption. With the frequency of the survey current dependent on the formation and mud characteristics, for example, the operating frequency of the acquisition circuitry 102 can self-adjust to an optimum value needed for the particular formation and mud conditions encountered. To do this, the acquisition circuitry 102 can have pulse-shaping circuitry (discussed below) that favors longer or shorter resolving times of a discharged pulse so a better response can be obtained. Various time constants and other variables can be selected for this pulse shaping circuitry so the frequency response of the acquisition circuitry 102 better matches the expected pulse discharges. In the end, this can improve the signal-to-noise ratio of the imager's measurements.

In addition, the relationship of the acquisition circuitry 102 with the borehole environment can be used to better control the energy stored in the circuitry's reactive component (134; FIG. 3). If the peak amplitude of the circuitry's discharged pulse is "low," then the acquisition circuitry 102 can increase the time of the drive pulse (i.e., can store more energy in the reactive component) to apply more energy to the formation. Conversely, as the resistivity of the formation increases, the acquisition circuitry 102 can reduce the time of the drive pulse to apply less energy to the formation. Details of controlling the drive pulse time in relation to formation resistivity will be discussed below with reference to FIGS. 9A-9H, for example.

Finally, the ability of the imager's operating frequency to self-adjust to an optimum value needed for the particular formation and mud conditions encountered enables the imager 100 to measure not only in conductive mud (i.e., Water-Based Mud (WBM)), but also in non-conductive mud (i.e., Oil-Based Mud (OBM)) without needing to change the electrical or physical configuration of the imager 100. Details of this ability will be discussed below with reference to FIGS. 10A-10C, for example.

2. Dynamic Range

As noted previously, the imager 100 obtains a ratio between the voltage and the current responses at the electrode array 110 to determine the resistivity (or conductivity) of the formation. There are distinctive difficulties in obtaining a reading of voltage and current responses in a borehole. In one difficulty, resistivities encountered in boreholes can vary from low to high so obtaining a ratio of voltage and current response in such variances can be problematic, especially when there is interference in the measurements caused by the flow of survey current through the mud. At low mud resistivity, for example, the survey current tends to flow through the mud and away from the formation. On the other hand, oil-based mud, being an insulator, or other low conductive mud can limit the ability to inject the survey current into the formation.

To address the problem of dynamic range, the disclosed imager 100 can use one or more measurement techniques. In one measurement technique, the imager 100 maintains a given (constant) voltage distribution and reads the resulting survey current. This technique may work more effectively in low resistivity environments. In a contrary technique, the disclosed imager 100 can inject a constant current into the formation and can subsequently measure the resulting voltage drop. This technique is believed to be more advantageous in high resistivity environments. In still another technique, the power can instead be kept constant, which extends the range provided by the two previous measurement techniques.

Alternatively, the disclosed imager 100 can change the power level setting as a function of the signal-to-noise ratio in the measured data. Thus, the voltage, current, and power are not kept fixed from measurement to measurement in this alternative technique. Instead, the imager 100 can evaluate the signal-to-noise ratio from previous measurements and can establish a new power level setting to be delivered on the next measurement cycle. This reduces the power drawn by the imager 100 to only the amount required for each measurement cycle as multiple measurements are obtained and the tool 50 rotates and advances in the borehole. Basing the power level setting on the signal-to-noise also keeps the improved dynamic range provided by the constant power technique.

3. Power Consumption and Noise Reduction

In another difficulty for determining the resistivity (or conductivity) of a formation, the imager 100 operated in the downhole environment has a real limit on what power is available for obtaining measurements. Therefore, the disclosed imager 100 preferably consumes power efficiently. To address this problem of power consumption, the imager 100 uses the two-step cyclic process discussed previously. Because the imager 100 performs one measurement on each cyclic pulse, the imager 100 saves both power and time in making measurements.

While conserving power, operation of the imager 100 must still address issues with the signal-to-noise ratio in the measurements obtained. As will be appreciated, the dynamic range of the measurements is ultimately determined by the ratio between the signal obtained and the noise level of the imager 100. In the MWD/LWD application, the continuous rotation of the downhole tool 50 limits the usefulness of conventional correlation techniques to improve the signal-to-noise ratio as already stated. Advantageously, noise reduction techniques known in the art for nuclear instrumentation measurements can be employed to improve the imager's operation. This noise reduction offsets the inability to use standard correlation techniques during the processing of the pulse discharges with the disclosed imager 100.

4. Overview of Pulse Processing

In the cyclic pulse processing described previously, the imager 100 produces a discrete energy pulse. Subjected to impedance from the formation, the amplitude of the pulse discharge becomes higher (and the pulse discharge becomes narrower) as the resistivity of the formation increases. This is because the shape (amplitude and width) of the pulse discharge is determined by the formation and mud impedance.

Understanding this correlation between the pulse discharge and resistivity can be used to determine the resistivity of an unknown formation during sensing. The correlation between the pulse width and resistivity is also exactly what is needed to better couple the imager's array 110 to the formation in an oil-based mud environment where the coupling is by capacitive means. Since capacitive reactance goes down for short pulses, the coupling between the array 110 and the formation improves when the resistivity increases, as is needed in such a borehole environment. No additional measurements are believed needed, because the measurement technique inherently finds a best possible pulse width.

Figure 7A:
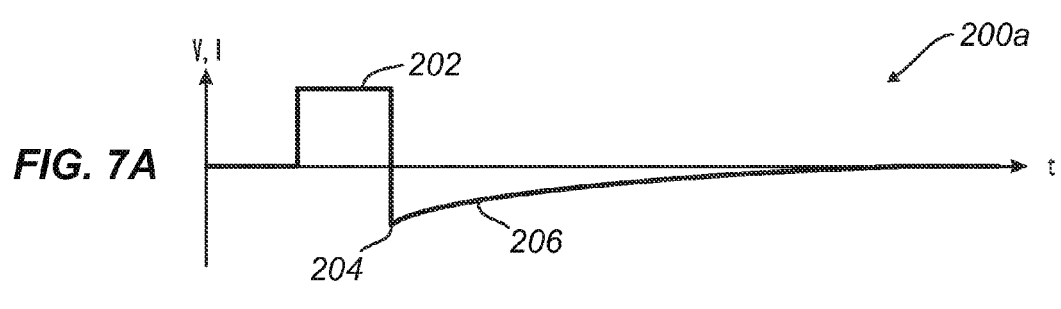
FIG. 7A diagrams the response of a pulse discharge in a lower resistivity environment.
Figure 7B:
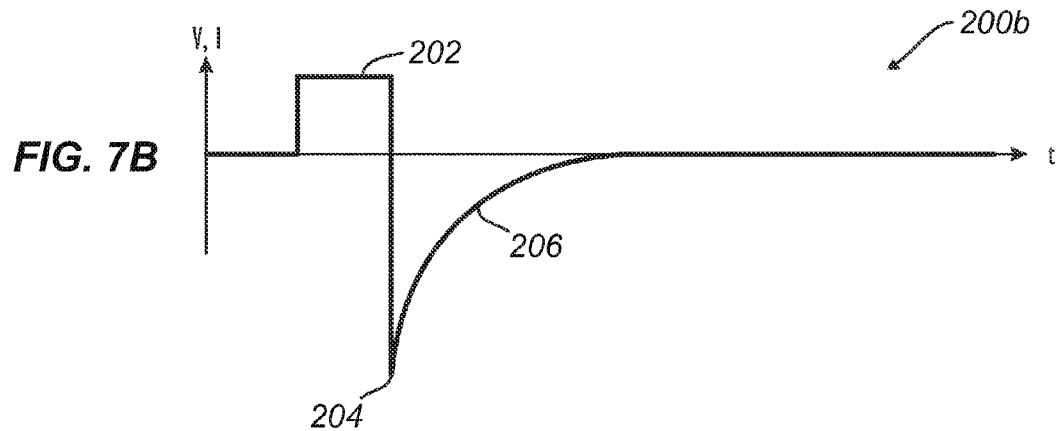
FIG. 7B diagrams the response of a pulse discharge in a high resistivity environment.
Figure 7C:
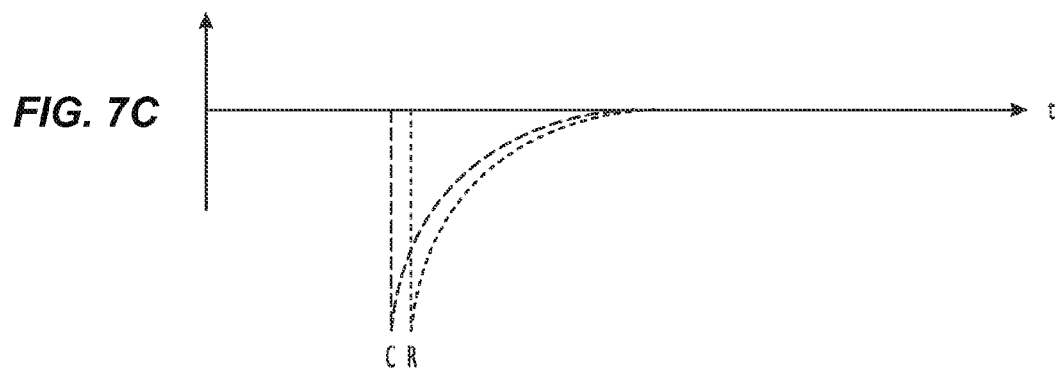
FIG. 7C diagrams potential phase differences in the capacitance and resistance responses of a pulse discharge.

Some particulars of the pulse processing are shown in FIGS. 7A-7C. As diagrammatically plotted in graph 200a of FIG. 7A, the pulsed discharge has a lower peak amplitude in the presence of lower formation's resistivity. As shown, the imager (100) produces a drive pulse 202 when energy is stored in the reactive component (134). After the release of the stored energy, the resulting pulse discharge of energy in the presence of low resistivity has a less marked peak amplitude 204 and extends for a long resolving time 206 before regaining levels.

Converse to this, the pulsed discharge of energy has a greater peak amplitude in the presence of higher formation resistivity. As diagrammatically plotted in graph 200b of FIG. 7B, the resulting pulsed discharge in the presence of high resistivity has a more marked peak amplitude 204 and extends for a shorter resolving time 206 before regaining levels. Pulse processing of the pulse discharges as in FIGS. 7A-7B allows the imager (100) to improve the signal-to-noise level and to determine characteristics of a formation's resistivity (conductivity) that produces such responses.

Moreover, the pulse processing discussed below can determine capacitive and resistive components of the pulse discharges caused by the resonant circuit formed between the imager 100 and the borehole environment. These capacitive and resistive components from the resonant circuit can have different timing (phase), as depicted in FIG. 7C. A measure of this time (phase) difference can be detected through pulse processing, and the measured difference can be correlated to know characteristics of a borehole environment, such as particular capacitance, mud resistivity, and formation resistivity.

5. Pulse Processing Chains

Figure 8A:
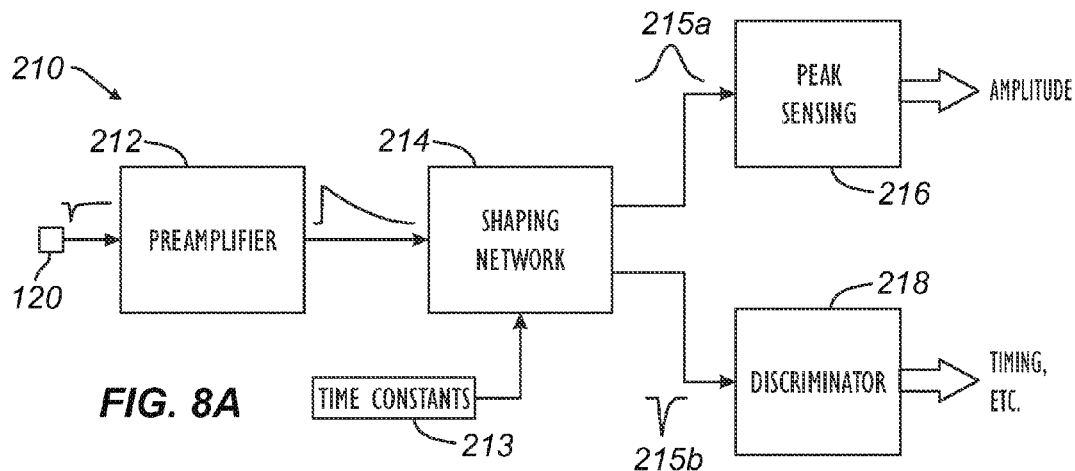
FIGS. 8A-8B diagrams two of the various possible pulse-processing chains for the disclosed imager.
Figure 8B:
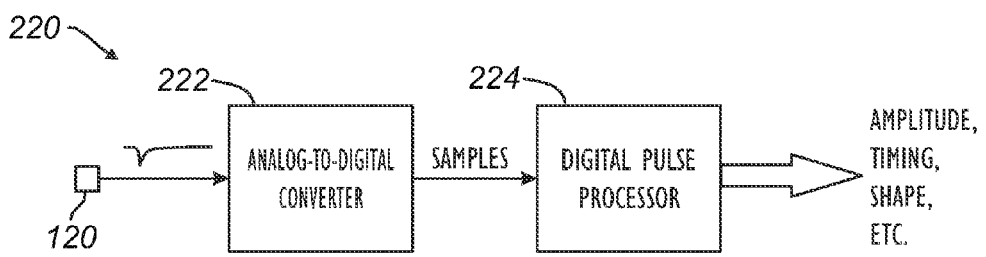
Figure 9A:
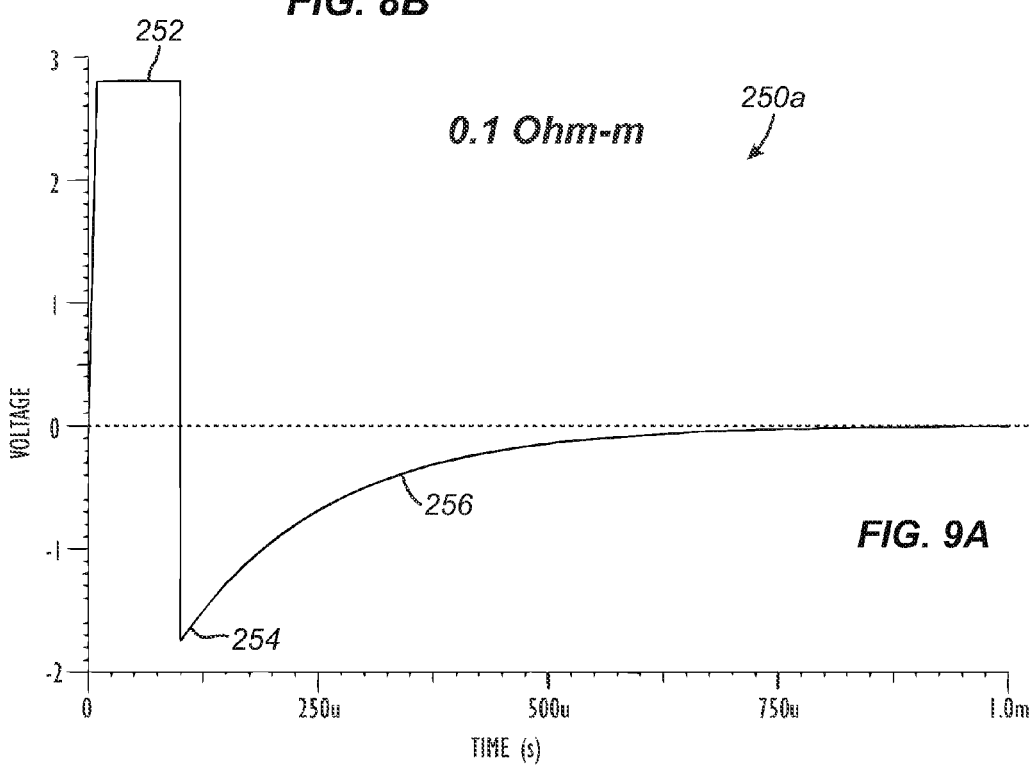
FIGS. 9A through 9H graph voltage responses measured by the disclosed imager subjected to different conductivity (resistivity) levels.
Figure 9B:
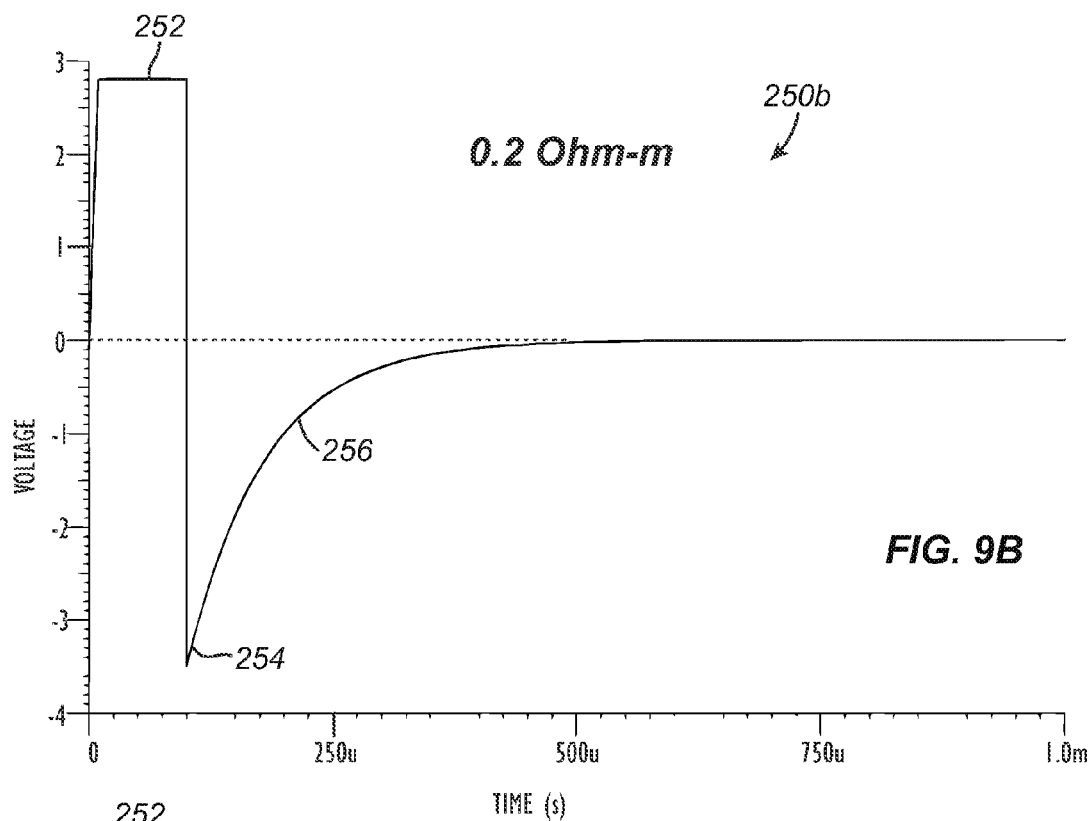
Figure 9C:
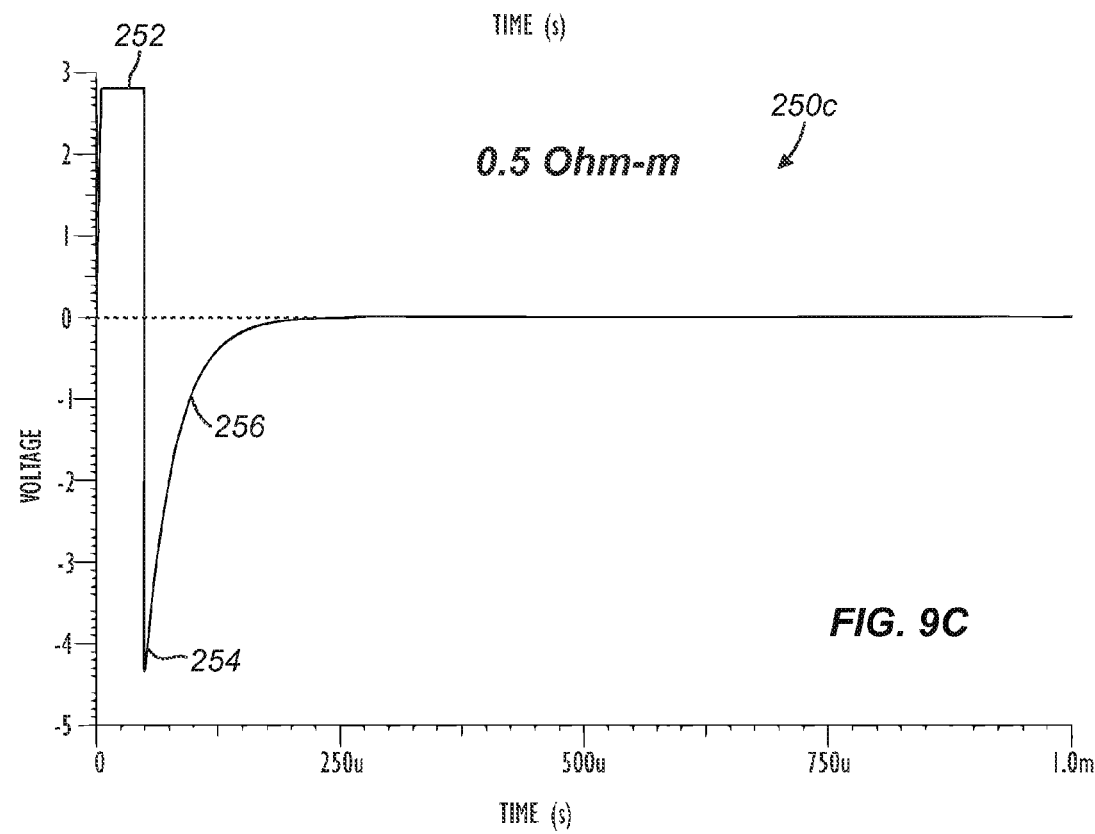
Figure 9D:
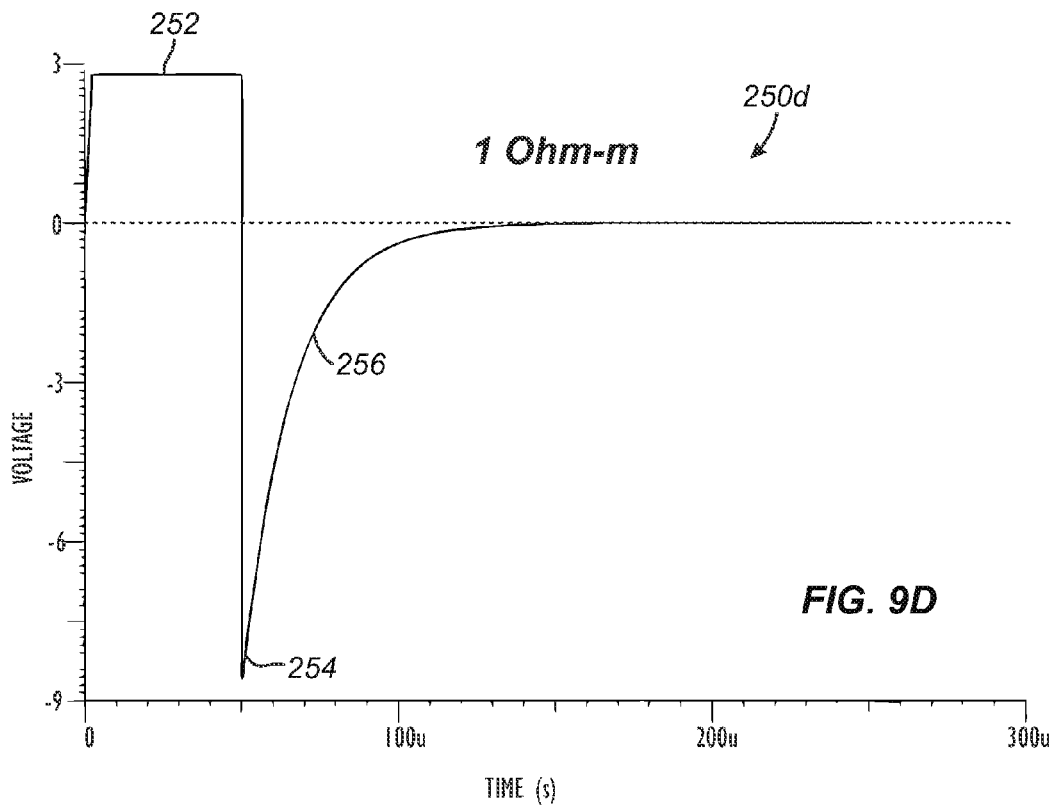
Figure 9E:
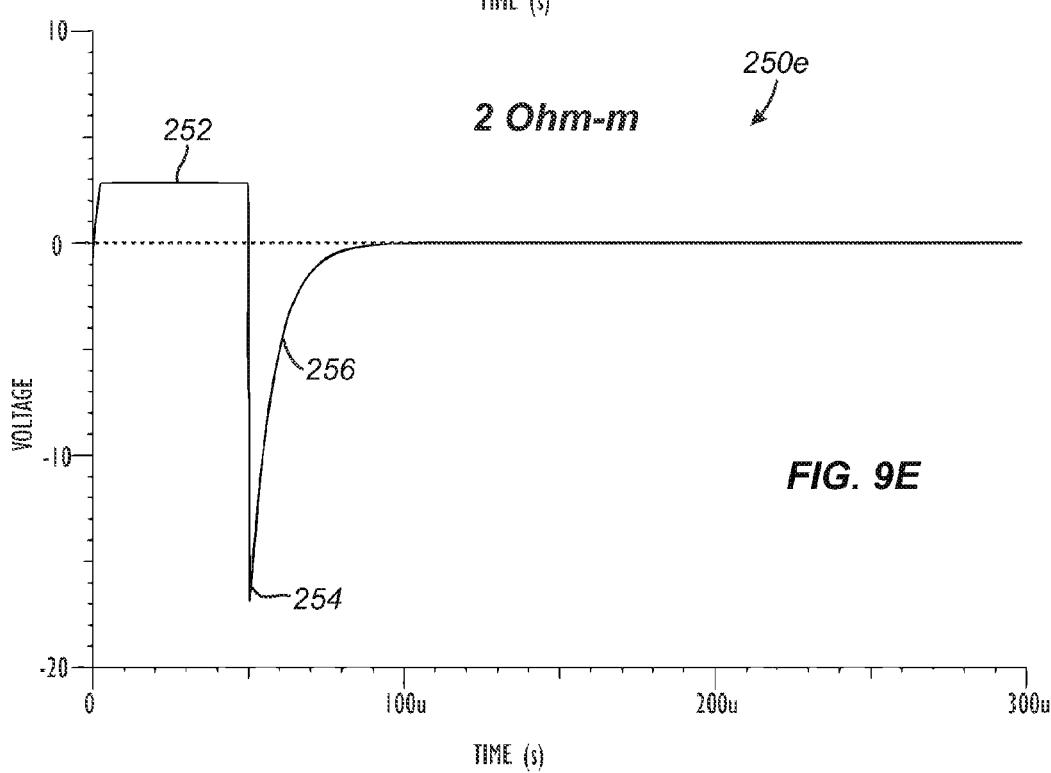
Figure 9F:
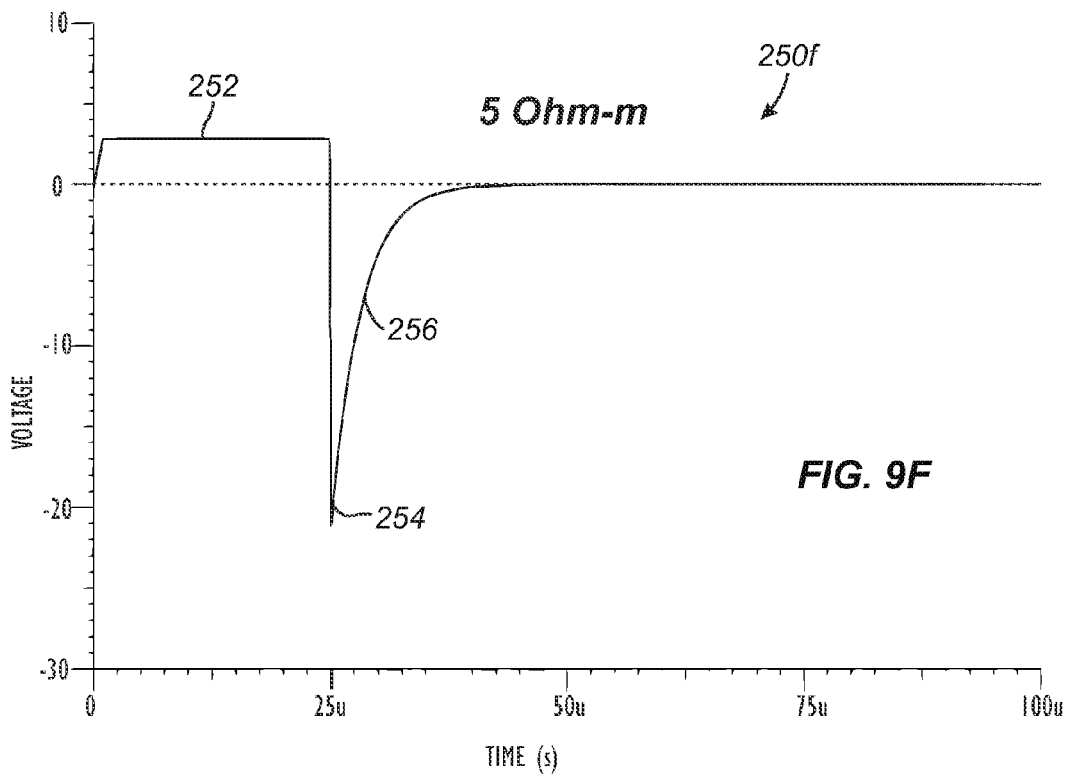
Figure 9G:
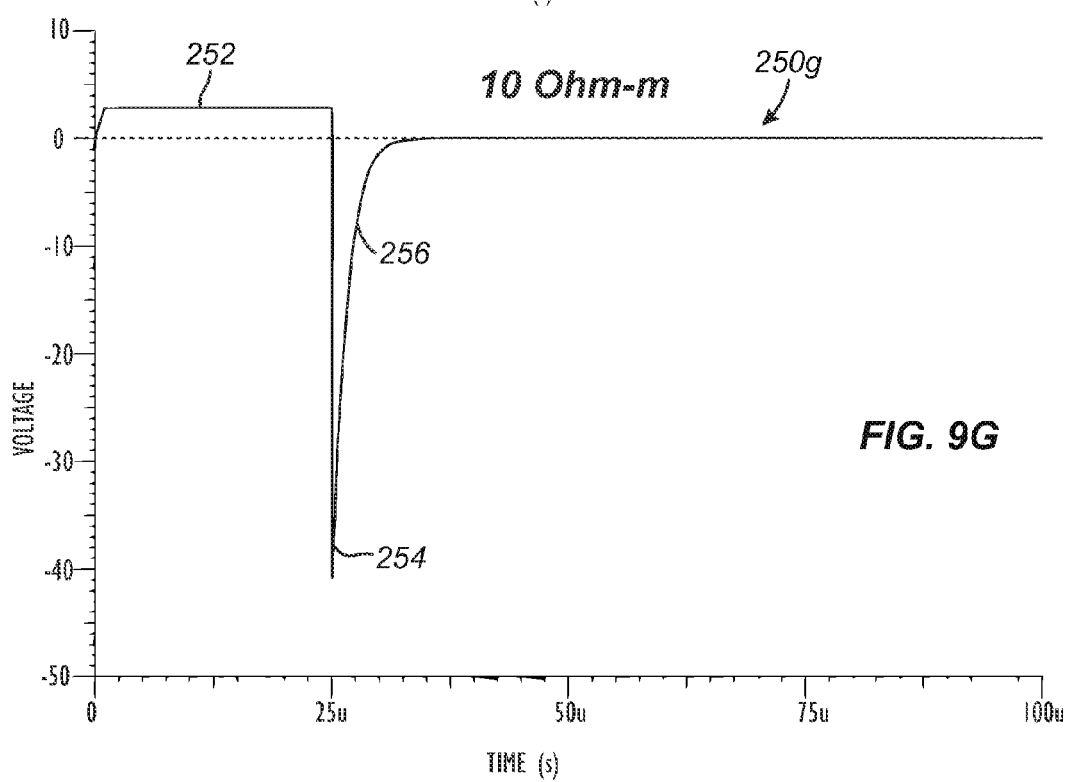
Figure 9H:
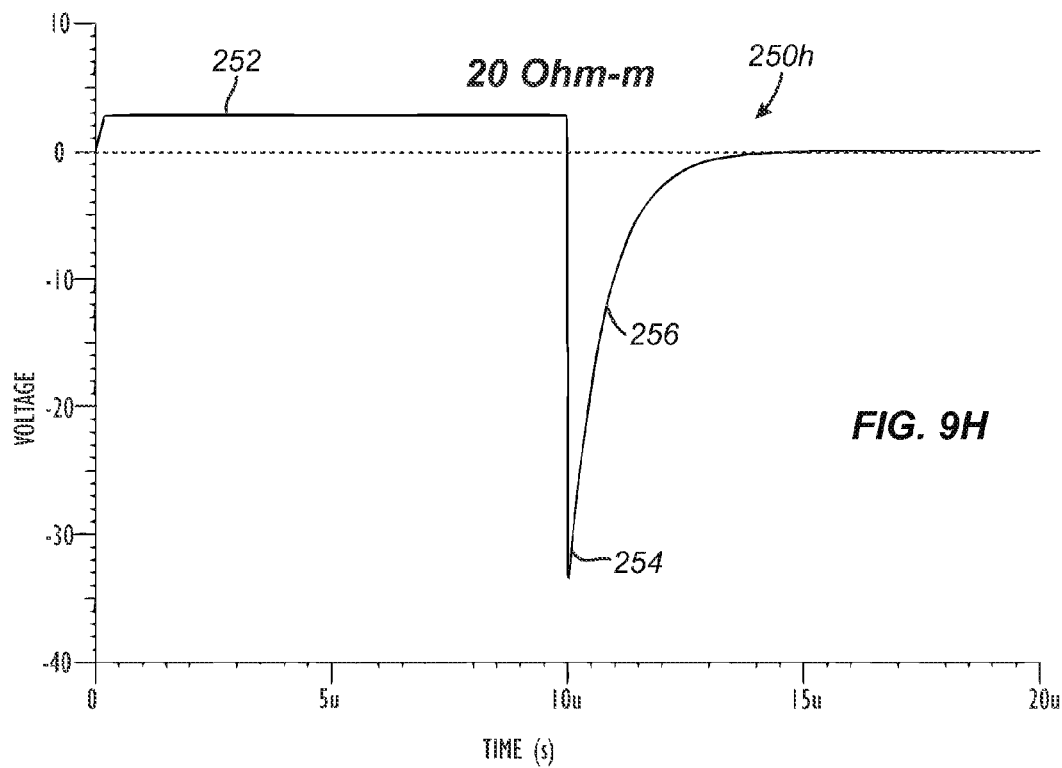

Several forms of pulse processing can be used to process the pulses for the disclosed imager 100 to determine the formation's resistivity. FIGS. 8A-8B show two pulse processing chains 210 and 220 that can be used. FIG. 8A shows an analog pulse processing chain 210 that uses a preamplifier 212, a shaping network 214, a peak sensor 216, and a discriminator 218. FIG. 8B shows a digital pulse processing chain 220.

In general, both of these chains 210 and 220 can be integrated into or part of the imager's acquisition circuitry (102; FIGS. 2-3) discussed previously. After processing the pulses, output of the chains 210 and 220 can be stored or telemetered for later processing by surface equipment as also detailed previously.

In general, each of these pulse processing chains 210 and 220 can be similar to those used in pulse processing in nuclear measurements applications. The pulse processing techniques use the pulse processing chains 210 and 220 to detect the peak amplitude of the pulse discharge as the discharged energy is subject to the formation and mud's impedance. The shape of the pulse and its amplitude are of particular interest in improving the signal-to-noise and in determining the resistivity of the formation. To make the detection, the chains 210 and 220 set time constants and other variables to detect the peak amplitude and shape of the pulse discharge when processing signal responses being measured by the measurement circuitry 120.

In FIG. 8A, for example, the analog pulse processing chain 210 receives a signal from the measurement circuitry 120 of the imager 100 and may use a preamplifier 212 to increase the input if weak. (The signal can be either a measured voltage or survey current response as discussed herein.) The shaping network 214 applies various time constants 215 to the signal to improve the signal-to-noise ratio. These time constants 215 relate to the rise time, resolving time, differentiation time constant, and integration time constant of the signal, and the particular time constants 163 used are intended to improve the signal-to-noise ratio.

Particularly useful relationships between time constants 215 and the resulting signal-to-noise ratio are known in nuclear pulse processing techniques. See e.g., A. B. Gillespie, *Electronics and Waves Series: Signal, Noise and Resolution in Nuclear Counter Amplifiers*, (1954), pgs. 14-18, 59-69, and 129-133, the details of which are incorporated herein by reference. Relationships from these known pulse processing techniques can improve performance of the resistivity imager 100. Therefore, as recognized in nuclear pulse processing, the integration and differentiation time constants 213 are preferably the same, which is known to improve the signal-to-noise ratio. The processing chain 210 can, therefore, take advantage of these and other techniques known in nuclear pulse processing.

As will also be appreciated, longer time constants 213 would tend to give a better signal-to-noise ratio. However, the disclosed imager 100 has a set time constraint between pulses in which the time constants 213 can be manipulated. In general, each of the discrete energy pulses may have about 2.7 milliseconds between them for the time constants 213 to be adjusted because the imager 100 makes a pulse and measurement at about every 2.8 milliseconds. Thus, the particular time constants 213 must be optimized in such a time constraint so that precise time constants 213 can be determined to improve the signal-to-noise ratio.

In any event, the time constants 213 are preferably selected to improve the signal-to-noise ratio relative to the pulse shape that would be encountered in less than ideal circumstances. For example, the time constants 213 could be chosen to improve the signal-to-noise ratio of a pulse shape resulting from a low conductive formation, increased intervening mud levels, and other unfavorable variables. Likewise, the selection of the time constants 213 can be based on simulation analysis, empirical testing, and other methods. As will be understood with the benefit of the present disclosure, such optimization can be subjective and can depend on the desired results, the implementation at hand, and other factors.

In its processing, the shaping network 214 can have a shaping amplifier that gives an amplitude signal 215a indicative of the pulse's peak amplitude. In turn, a peak sensor 216 can determine the peak amplitude of the discrete energy pulse from this amplitude signal 215a. The shaping network 214 can also have a timing amplifier to preserve the timing information of the pulse discharge. The timing signal 215b of the timing amplifier feeds to the discriminator 218, which applies various thresholds and the like to the timing information. Logic modules (not shown) can then provide useful information about the pulse discharge being analyzed, such as its timing information, the pulse shape character (rise time, resolve time, etc.), and other information of interest.

In FIG. 8B, the digital pulse processing chain 220 receives the signal from the measurement circuit 120 and uses an analog-to-digital converter 222 to digitize the signal. (Again, the signal can be either a measured voltage or survey current response as discussed herein.) Samples obtained at a very high sample rate are then fed to a digital pulse processor 224. Analyzing the digital samples, the digital pulse processor 224 determines the parameters of interest, such as energy, timing, counting, and shape through digital analysis. Again, firmware time constants (not shown) can be used to improve the signal-to-noise ratio in this pulse processing chain 220 in a manner similar to that discussed previously.

6. Examples Responses for Pulse Processing

With an understanding of the generated pulses and the pulse processing performed, discussion now turns to example operation of the disclosed sensor 100 modeling pulses in different conditions. FIGS. 9A through 9H show various graphs, illustrating responses 250a-h of the guard voltage of the imager (100) during pulsing in a borehole environment having Water-Based Mud (WBM). In this instance, the resistivities of the mud and the formation are considered as the same, but as will be appreciated, they may differ in various implementations so characteristics of the mud may be independently determined. Although the voltage responses measured for the guard electrode (114) are depicted, the survey current responses measured for the measuring electrode (112) would be similar and could undergo similar analysis.

The responses 250a-h show the shape of the guard voltage (and by implication the shape of the survey current) under different formation conditions. Resistivity of the formation increases from 0.1 Ohm-m to 20 Ohm-m in these examples. In the responses 250a-h, the horizontal (time) scale and the drive pulse width have been adjusted to better detail how the timing changes as a function of the formation/mud parameters.

Two pulses are shown in each of the responses 250a-h. The first pulse 252 depicts the drive in the first part of the measurement cycle as the reactive component (i.e., transformer 134; FIG. 3) is connected to the power source (140) and stores energy. After a time period, the second part of the measurement cycle is initiated when the reactive component (134) is disconnected from the power source (140). A resulting pulse discharge follows, rising to a peak amplitude 254 and following with a resolving decay 256.

These responses 250a-h in FIGS. 9A-9H show how the shape of the guard voltage changes as the subject resistivity changes. In the first few measurements graphed, the decay 256 may extend to about 1.0 milliseconds. As the resistivity increases, however, the decay 256 gets shorter as can be seen in the response 250a-h. In addition, the peak amplitude 254 of the discharges increase in FIGS. 9A-9H as the imager 100 encounters increasing resistivity, as can be seen in the response 250a-h. Finally, the width of the drive pulses 252 decreases in FIGS. 9A-9H as the imager 100 adapts to the amount of energy needed with the increasing resistivity encountered.

By analyzing the pulsed discharge's peak amplitude 254, the resolving time of the decay 256, and other variables of interest from the response, pulse processing can determine characteristics of the impedances encountered by the array (110) from the surrounding environment (i.e., formation, formation fluids, water, mud, etc.), which in turn equate to a resistivity (conductivity) measure of the formation. For example, the amplitude of the discharge's peak amplitude 254 is of interest in determining the resistivity (conductivity) of the formation, which can be derived using calculations known in the art based on Ohm's Law. Additionally, the discharge pulse's shape is of interest in the pulse processing techniques to improve the signal-to-noise ratio because the shape can determine the various time constants (i.e., 213; FIG. 8A) involved in the pulse processing.

Figure 10A:
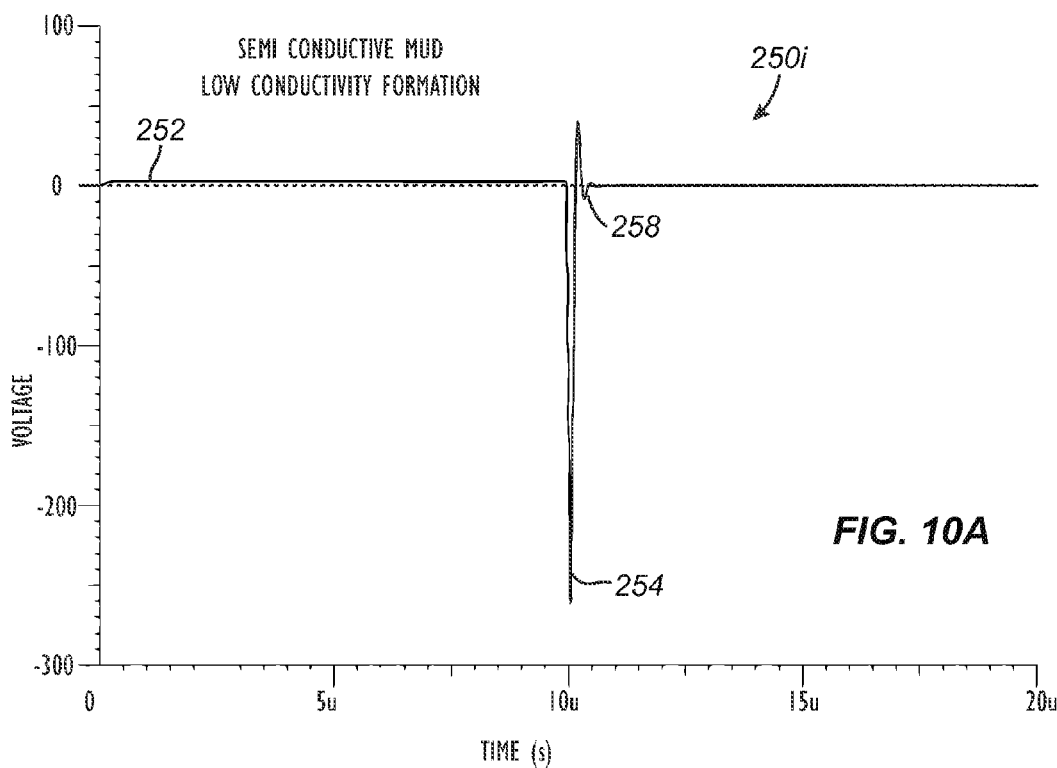
FIGS. 10A-10C graph voltage responses measured by the disclosed imager in semi-conductive mud or OBM and subjected to different conductivity (resistivity) levels.
Figure 10B:
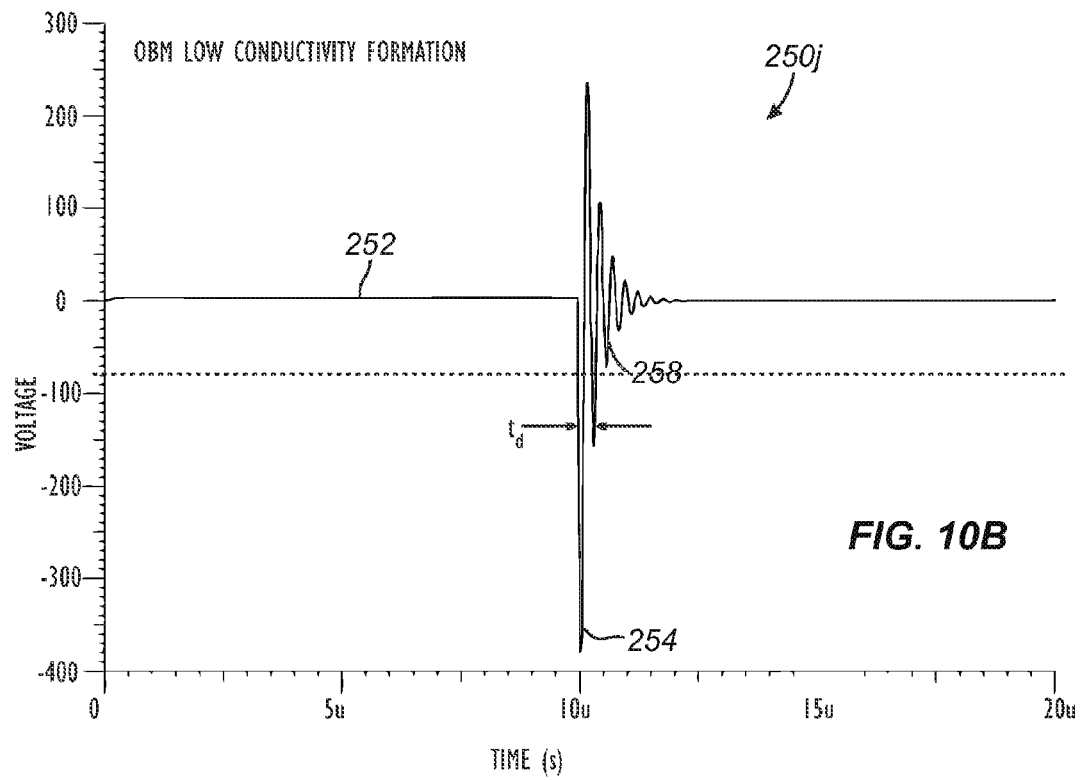
Figure 10C:
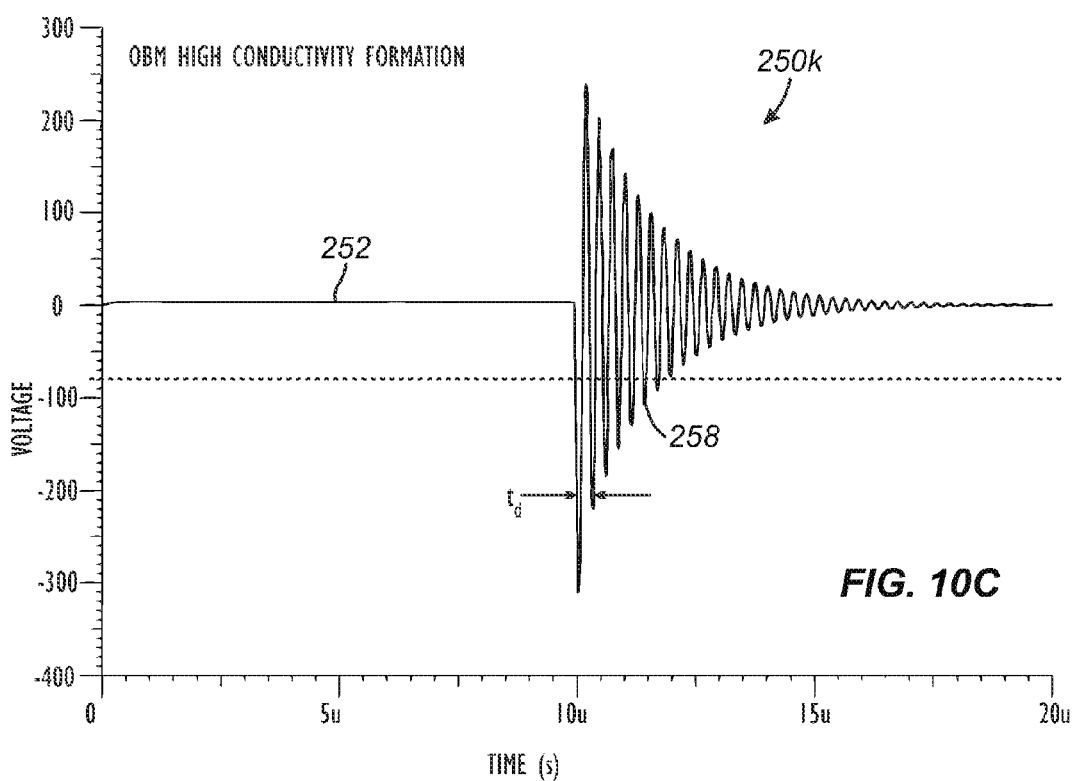

Additional responses 250i-k of FIGS. 10A-10C simulate waveforms expected in the presence of low conductivity or Oil-Based Mud (OBM) in low and high conductivity formations. As in known, OBM has an increased resistance, making measurement of a formation's resistivity (conductivity) difficult when OBM is present. Nevertheless, the disclosed imager 100 can obtain useful information from measurements when OBM is present as shown below.

In FIG. 10A, the guard voltage response 250i indicates the shape of the survey current when a low conductivity formation is encountered and when a semi-conductive mud is present in the borehole. Here, the pulse width of the drive pulse 252 is considerably short (about 10 µs) as the imager 100 adapts to the energy needed. The following peak amplitude 254 in the discharge is considerably high (reaching over −250V), and a slight oscillation 258 follows the peak amplitude 254 as the response 250i resolves.

In FIG. 10B, the guard voltage response 250j indicates the shape of the survey current when a low conductivity formation is encountered and when OBM is present in the borehole. Here, the pulse width of the drive pulse 252 is again considerably short (about 10 µs). The following peak amplitude 254 at discharge is considerably higher (reaching almost −400V), and a more pronounced oscillation 258 follows the peak amplitude 254 as the response 250j resolves.

In FIG. 10O, the guard voltage response 250k indicates the shape of the survey current when a high conductivity formation is encountered and when an OBM is present in the borehole. Again, the pulse width of the drive pulse 252 is considerably short (about 10 µs), and the following peak amplitude 254 at discharge is also considerably high (reaching almost −400V). Here, a pronounced oscillation 258 follows the peak amplitude 254 in this situation and has a longer resolve time than that encountered in a low conductivity formation of FIG. 10B.

Although the pulsed discharges are different in the presence of semi-conductive or OBM than those encountered in WBM as in FIGS. 9A-9H, characteristics of the discharges, such as the time for the oscillation 258 to resolve, the frequency of the oscillation 258, the peak amplitude 254, and the like can still be used to determine properties of the formation, such as its resistivity (conductivity). For example, pulse processing can detect the successive peaks of the oscillations 258, and the timing difference $t_d$ between the successive peaks can indicate the oscillation's frequency. The resulting frequency of the resolving response can then equate to properties of the formation's resistivity (conductivity).

In particular, the disclosed imager 100 can be used in the presence of OBM relative various known formation conductivities, and the pulse processed frequency of the discharge's oscillations 258 can be correlated to the known formation conductivities. Then, when making in situ measurements of an unknown formation conductivity in the presence of OBM, the pulse processing can determine the frequency of the discharge's oscillations 258 and can correlate the determined frequency to a corresponding known formation conductivity.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment of aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A resistivity imager for a formation traversed by a borehole, the imager comprising:
  pulse generation circuitry generating a plurality of discrete energy pulses;
  an array having electrodes exposed to the formation in the borehole, one or more of the electrodes discharging the discrete energy pulses into the formation and being subjected to impedances in response thereto;
  measurement circuitry operatively coupled to the array and measuring discharges of the discrete energy pulses subjected to the impedances; and
  control circuitry processing the measured discharges and determining parameters indicative of resistivity of the formation based on the processed discharges.

2. The imager of claim 1, wherein the pulse generation circuitry comprises a reactive component coupled to the array and selectively coupling to a power source to generate the discrete energy pulses.

3. The imager of claim 2, wherein the reactive component is selected from the group consisting of an inductor, a transformer, and a capacitor.

4. The imager of claim 1, wherein the electrodes of the array comprise a measuring electrode, a guard electrode disposed adjacent the measuring electrode and electrically isolated therefrom, and a return electrode disposed adjacent the guard electrode and electrically isolated therefrom.

5. The imager of claim 4, wherein the measurement circuitry comprises voltage measuring circuitry operatively coupled between the pulse generation circuitry and the array and measuring a voltage response at the guard electrode.

6. The imager of claim 4, wherein the measurement circuitry comprises current measuring circuitry operatively coupled between the pulse generation circuitry and the array and measuring a current response at the measuring electrode.

7. The imager of claim 4, wherein the electrodes of the array comprise a plurality of the measuring electrode, and wherein the measuring electrodes have at least one aspect of size, azimuthal location, lateral location, and longitudinal location different from one another.

8. The imager of claim 1, further comprising memory storing the determined parameters indicative of the resistivity of the formation.

9. The imager of claim 1, further comprising processing circuitry obtaining the determined parameters and outputting an image indicative of the resistivity of the formation traversed by the borehole.

10. The imager of claim 1, further comprising a telemetry unit telemetering information related to the determined parameters.

11. The imager of claim 1, further comprising a rotatable body disposed in the borehole and having the array disposed thereon.

12. The imager of claim 11, wherein the rotatable body comprises a drill collar, and wherein the electrodes of the array comprise:
a guard electrode disposed on the drill collar and electrically isolated therefrom; and
at least one measuring electrode disposed on the guard electrode and electrically isolated therefrom.

13. The imager of claim 12, wherein the guard electrode comprises at least a portion of a sleeve disposed on the drill collar.

14. The imager of claim 12, wherein the electrodes of the array comprise a return electrode being at least a portion of the drill collar.

15. The imager of claim 1, wherein the pulse generation circuitry generates the discrete energy pulses as the array rotates in the borehole, and wherein the control circuitry associates an orientation in the borehole with each of the determined parameters.

16. The imager of claim 1, wherein the determined parameters each comprise a ratio of a voltage response and a current response in the measured discharge.

17. The imager of claim 1, wherein to process the measured discharges, the control circuitry comprises a pulse processing chain determining one or more characteristics of the measured discharges.

18. The imager of claim 17, wherein the control circuitry correlates the one or more determined characteristics to the parameters indicative of resistivity.

19. The imager of claim 17, wherein the pulse processing chain uses time constants in processing the measured discharges, the time constants selected to improve a signal-to-noise ratio of the measured discharges.

20. The imager of claim 19, wherein the time constants include a differentiation time constant and an integration time constant that are the same.

21. The imager of claim 17, wherein the pulse processing chain comprises a shaping network processing the measured discharges into first information characteristic of an amplitude of the measured discharges and second information characteristic of a timing of the measured discharges.

22. The imager of claim 17, wherein the pulse processing chain comprises a digital-to-analog converter obtaining a plurality of samples of the measured discharges and comprises a digital pulse processor processing the samples and determining first information characteristic of an amplitude of the measured discharges and second information characteristic of a timing of the measured discharges.

23. The imager of claim 1, wherein the pulse generation circuitry has an operating frequency and forms a resonant circuit with the formation and any intervening mud disposed therebetween, the pulse generation circuitry automatically adjusting the operating frequency in response to the resonant circuit formed.

24. The imager claim 1, wherein the pulse generation circuitry dynamically uses power for the discrete energy pulses based on a ratio of signal to noise in the measured discharges.

25. A downhole apparatus for a borehole traversing a formation, the apparatus comprising:
a body disposed in the borehole of the formation; and
an imaging sensor disposed on the body, the imaging sensor comprising:
pulse generation circuitry generating a plurality of discrete energy pulses,
an array having electrodes exposed to the formation in the borehole, the array discharging the discrete energy pulses into the formation and being subjected to impedances in response thereto,
measurement circuitry operatively coupled to the array and measuring discharges of the discrete energy pulses subjected to the impedances, and
control circuitry processing the measured discharges and determining parameters indicative of resistivity of the formation based on the processed discharges.

26. The apparatus of claim 25, wherein the body comprises a rotatable component in the borehole and having the array disposed thereon.

27. The apparatus of claim 26, wherein the rotatable component comprises a drill collar.

28. A method of imaging a formation traversed by a borehole, the method comprising:
generating discrete energy pulses;
subjecting an array of electrodes to impedances by discharging the discrete energy pulses into the formation with the array;
measuring current responses from discharges of the discrete energy pulses at the array in response to the subjected impedances;
measuring voltage responses from the discharges of the discrete energy pulses at the array in response to the subjected impedances; and
determining parameters indicative of resistivity of the formation by processing at least one the measured current or voltage responses.

29. The method of claim 28, further comprising rotating the array of electrodes on a rotatable body in the borehole.

30. The method of claim 28, wherein generating the discrete energy pulses comprises:

forming a resonant circuit with the formation and any intervening mud disposed therebetween in the borehole; and automatically adjusting an operating frequency of the discrete energy pulse generation based on the resonant circuit formed.

31. The method claim 28, wherein generating the discrete energy pulses comprises dynamically using power for the discrete energy pulses based on a ratio of signal to noise in at least one of the measured current or voltage responses.

32. A resistivity imager for a formation traversed by a borehole, the imager comprising:
    means for generating discrete energy pulses;
    means for discharging the discrete energy pulses into the formation;
    means for measuring discharges of the discrete energy pulses subjected to impedances in response to the discharging into the formation; and
    means for determining parameters indicative of resistivity of the formation based on the measured discharges.

33. The imager of claim 32, wherein the means for determining parameters indicative of resistivity of the formation comprises means for processing the measured discharges subjected to impedances in presence of water-based mud and oil-based mud.

* * * * *